July 13, 1954 T. A. BANNING, JR 2,683,769

COLOR TELEVISION AND THE LIKE

Filed Nov. 27, 1950 7 Sheets-Sheet 1

Inventor:

Thos. A. Banning, Jr.

July 13, 1954 T. A. BANNING, JR 2,683,769

COLOR TELEVISION AND THE LIKE

Filed Nov. 27, 1950 7 Sheets-Sheet 2

Inventor:

Thos. A. Banning Jr.

July 13, 1954 T. A. BANNING, JR 2,683,769

COLOR TELEVISION AND THE LIKE

Filed Nov. 27, 1950 7 Sheets-Sheet 3

Inventor: Thos. A. Banning Jr.

July 13, 1954 T. A. BANNING, JR 2,683,769

COLOR TELEVISION AND THE LIKE

Filed Nov. 27, 1950 7 Sheets-Sheet 4

Inventor: Thos. A. Banning Jr.

COLOR TELEVISION AND THE LIKE

Filed Nov. 27, 1950 7 Sheets-Sheet 5

Inventor:
Theo. A. Banning Jr.

Inventor:
Thos. A. Banning Jr.

Inventor:
Thos. A. Banning Jr

Patented July 13, 1954

2,683,769

UNITED STATES PATENT OFFICE 2,683,769

COLOR TELEVISION AND THE LIKE

Thomas A. Banning, Jr., Chicago, Ill.

Application November 27, 1950, Serial No. 197,782

40 Claims. (Cl. 178—5.2)

This invention relates to improvements in color television, and the like. The present improvements have been devised with reference to presently universally used methods of black and white television, and with reference to the presently used equipment for such black and white television operation, and with one object to enable conversion from black and white to color television with a minimum of change of equipment at both the transmission and receiving ends of the system. In this connection I will here state that according to the improvements herein disclosed the changes needed in the receiver concern themselves almost exclusively with changes in the kinescope or translating tube, and the use of said improvements requires little if any change in the receiver circuits other than in some cases the addition of very simple means to ensure correct "color synchronization," as will presently appear. I will also here state that when using my present improvements it is also possible to receive in color from sending stations transmitting the necessary color signals, whether such transmission be made according to any one of various forms of transmitting equipment and methods; provided, only, that the frequency of transmission, and the number of lines scanned per "frame" be standard according to the standards specified by the F. C. C. In other words, if the sending operations conform to those specified by the F. C. C. as to rate of scanning, and as to number of lines scanned per frame, my improvements may be used for either black and white or color reception, having been designed to meet those specifications.

The following statements are pertinent preliminary to explanation of my present improvements:

According to presently standard television operations the scanning at the sending station is effected on the basis of a total of 525 lines across the frame between the top and bottom of the frame. It is also customary to produce this scanning in such a manner that alternate lines are first scanned from top to bottom, and then the intermediate lines are scanned by "interlacing" between such previously scanned lines. Under this system if 263 lines are scanned on the first operation, there will be left 262 spaces to be scanned on the succeeding "interlacing" operation, after which the next scan of 263 lines will be made, then the next "interlace," etc. Of course the receiver must be capable of translating a corresponding number of lines across its screen, within its upper and lower limits, and must be designed to translate for the full width of screen needed to accommodate the complete frame. The transmitting equipment is so designed as to produce these transverse scans or linear movements of the scanning beam of the iconoscope at equally spaced intervals within a close toleration. Likewise the receiving equipment, as presently used, is designed to produce the transverse movements of its scanning beam (translating beam), at regular and equally spaced scans, within a very close toleration. One means to effect the spacing of such scanned lines includes the use of a "saw-tooth" generator to produce the regular variations of voltage needed to effect lateral beam movements, and another "saw-tooth" generator to produce the regular variations of voltage needed to effect shift of the beam from line to line. Such electronic means are well known and are practically standard in this art at the present time. I here mention them only from the standpoint that close control of the spacing of the scanned lines is desirable for color interpretation according to my present system, but such control is being presently secured in acceptable receivers intended for black and white reception.

Now when operating on the simple black and white system the strength of illumination at each point of the image in the iconoscope affects the condenser action according to such black and white principle, that is, the signal is responding to the intensity changes of black and white, and without regard to color variations. Likewise the translating beam of the kinescope of the receiver is varying in strength according to these signals sent out by the iconoscope, and therefore such response is solely on the basis of strength of white light. Also, the viewing screen of the receiver is provided with fluorescing material which responds directly to the received signals as interpreted by the translating beam of the kinescope, and such viewing screen thus fluoresces with a varying strength which is directly controlled by the electron beam. Also, the fluorescing material of the viewing screen is of a nature which emits white light when excited by the electron beam of the kinescope.

According to my present improvements I provide a lineated color screen or element in or in conjunction with, or as a portion of the viewing screen of the kinescope, said lineated screen being so constituted that its lineations may present to the observer in front of the screen lineations of the primary colors (generally three, namely, a red, a green, and a blue-violet). Sometimes I provide these lineations as the transparent colored lines of a transparent lineated screen located between the fluorescent surface at the back of the viewing window, and the observer, so that any given spot of illumination produced by the electron beam on the fluorescent material or phosphor will be viewed by the observer through a transparent colored portion of the lineated screen and such spot of illumination will then appear as of a color determined by such registered portion of the lineated screen. By a like analysis, when the spot of illumination produced by the electron beam is located elsewhere on the fluorescent surface such spot will appear to the observer as of a color determined by the transparent color of the screen in viewing alignment with such new location of excitation of the phosphor by the electron beam. Also, the intensity of illumination at each point will depend on the controlled intensity of the electron beam at each such point. This controlled intensity at each point is determined by the signal being received from the sending station to which the receiver is tuned, according to well understood and presently widely used principles of operation in this art.

Or again, the "lineated screen" may comprise lineations of different phosphors, which phosphors, when excited by the electron beam, emit wave lengths of different ranges (in Angstrom units, A.-U.), so that the different lineations of such variegated phosphor form of screen will show different colors as determined by the lineation locations on the screen at which the electron beam produces the viewed excitations.

Various systems are presently available for producing and sending signals for television, which signals are controlled according to the varying colors scanned on the image being analyzed. The scanning operations are linear scans produced by the electron scanning beam (or beams) of the inconoscope (or iconoscopes), or other equipment, and said scanning operations are so conducted that the signals sent out for successive points linearly scanned are controlled both as to intensity of said signals and otherwise according to the pattern being scanned and the color thereof from point to point. According to the principles of my present invention I avail myself of the linear operations being presently used for both the scanning and receiving or translating equipment.

According to one embodiment of my present invention, I provide for color selection in the viewing screen, one complete line at a time, in which case I provide for color linear interpretation with beam movements parallel to and registered with the three primary color lines. According to another embodiment of my invention I provide for linear interpretation transversely of the color lines, so that during each linear movement of the electron beam it will act on the fluorescent screen at points registering with the successive lineations, intersecting said lineations one after the other, to thus successively intersect lineations for the three primary colors in regular order, and repeatedly. In the first mentioned embodiment the scanning in the sender is according to one of the primary colors during each complete linear scan, and the receiver must likewise translate parallel and coincident with the lineations of the kinescope viewing screen. Such a sending operation may include the use of a segmented color disk having transparent segments of the primary colors through each of which segments the light beam reflected from the object passes during one or more successive scans. In the second mentioned embodiment the scanning beam of the inconoscope will successively scan across lineations. one after the other, repeatedly during each complete linear movement of the scanning beam, and the kinescope of the recevier must respond to produce translation across the lineations of the viewing screen to produce successive color changes, as well as changes of strengths, during each linear translating movement of the kinescope beam.

In the first case each line of scan is scanned for its full length from side to side for an unchanged color from the segmental disk. The receiver should also be so constituted that its translating beam will operate on each colored line of the kinescope to be treated, throughout the full length of such line, and not transversely thereof. As an example of sending means capable of operation to produce signals which may be used in a receiver operating according to the second above mentioned system (that in which the translating beam of the kinescope moves across all of the lineated lines of the screen in succession instead of parallel to and coincident with them) I may mention the so-called "three scanner, sampler, and adder" arrangement of the R. C. A. wherein the signals are sent out by "dots" with the successive dots corresponding to successively color influenced elements of the image which is scanned. Signals sent out according to this system may be received by kinescopes and viewing screens embodying the features of my present invention when the lineated screen is so placed (angularly) that the electron beam of the kinescope will successively traverse all the colored lineations in regular succession and with regular repetition, and in synchronism with the signals being received from the sending station according to such "dots."

It is to be noted that in either of the foregoing uses of my present improvements the color synchronization may be produced (so as to ensure correct color interpretation and production of a correct color replica) by slight shift of the lineated screen or shift of the zone of operation of the electron beam. When the translations of the kinescope are by beam movements parallel to the color lineations synchronizing is effected by slight shift of the lineated screen and/or the zone of beam movement at right angles to the direction of beam scan, and also, if need be, by slight tilt of the screen or the direction of beam scan so as to bring the beam scans into exact parallelism with each other. When the translations are across the screen lineations the synchronizing is effected by changing the length of the kinescope beam scans so that the proper number of color lineations is crossed by each scan of the electron beam, and so that the successive colors of the lineations are contacted or excited by the beam in proper synchronism with the receipt of signals corresponding to the colors being scanned by the sending iconoscope. By so shifting such lineated screen not only will it be brought to a calibration such that exact registry of the electron beam with the line being translated is secured, but also it will be possible to ensure that the lineation being currently in registry with such beam will be of color correct according to the signals then being translated. Such synchronization may in many cases be secured by use of the means already present in the receiving unit for shifting the range of movement of the electron beam bodily up or down, or from one side to the other. In the absence of such presently available means I contemplate the provision of such supplemental shifting means as may be required to perform this synchronizing function. This supplemental means may take the form of a supplemental coil mounted on the shank of the kinescope tube, together with suitable manual means to permit control of the said coil to a desired adjusted strength of excitation.

To facilitate color synchronization I also contemplate the provision of means to so control the electron beam signals emitted by the sending iconoscope that at specified locations of the scanning there shall be produced signals corresponding to the three primary colors, such locations of the iconoscope scanning being of material size so that corresponding color signals shall be emitted over a size of movement and area sufficient to be able to produce corresponding color patches on the viewing screen. For example, the arrangement may be such that one of the primary color signals shall be emitted corresponding to one corner of the scanned area, another of the primary colors shall control signals emitted from another corner of the scanned area, and the third primary color shall control signals emitted from the central portion of an opposite edge of the scanned area. If the selected primary colors are red, green, and blue-violet, such an arrangement would cause red signals to be emitted for one corner of the scanned area, blue-violet signals to be emitted for the other corner of the same side of the scanned area, and green signals to be emitted from the central portion of the opposite edge of the scanned area. When the receiver is properly synchronized for color there will then appear corresponding small colored patches, correspondingly located, on the viewed image appearing on the viewing screen. These areas may be circular, or rectangular, or of other forms. It is here noted that when proper color synchronization has been effected the proper colors will appear at these patches of the viewing screen whether the scanning and translation be according to electron beam movements parallel and coincident with the color lines, or transversely thereof, as previously referred to herein.

According to conventional systems of black and white television the translating movements of the kinescope electron beam correspond to the scanning movements of the iconoscope electron beam. When the scanning movements of the iconoscope beam are lateral—across the image—the translating movements of the kinescope beam are also lateral; and the number of lines of translating movement is always equal to the number of lines of scanning movement. Also, when the system used is one wherein use is made of the interlacing principle, the translating movements of the kinescope beam are of like nature and sequence. Accordingly, it is merely necessary to ensure that the color relationships existing in the scanning operation and in the corresponding translating operation shall correspond to each other in order that correct color translation shall be produced at the viewing screen.

Various means may be used to ensure proper color discrimination in the scanning operations of the iconoscope. For example, use may be made of a three color segmental disk located in the optical system of the sending station so that one scanning operation may be made across the image and from top to bottom thereof while one color segment is in line of the optical system of the sending station, followed by another scanning operation across the image and from top to bottom thereof while a second color segment is in line of the optical system of the sending station, this second scanning operation being performed on the same scan lines as before or being an interlace; and followed by a third scanning operation across the image and from top to bottom thereof while the third color segment is in line of the optical system of the sending station, this third scanning operation being on the same scan lines as before or being a second interlace. Thereafter the first color segment of the disk would come into line of the optical system, and the entire scanning operation would repeat, scanning the original lines, and with subsequent scannings with the other two colors, the segmental disk moving from color to color in well understood manner. With this form of field scanning transmission the electron beam movements of the receiver kinescope would be properly synchronized with respect to the three color line groups of the iconoscope screen so that correct color interpretation would be ensured, the interlacings of the kinescope corresponding to the fields scanned by the sending iconoscope. This arrangement would permit reception and color interpretation correctly, by use of my color line form of viewing screen and my synchronizing, and without other change in said viewing screen, on the assumption that two interlaces could be provided. It is here noted that color translation can be accurately made by use of only two of the primary colors, properly selected as to wave lengths (in Angstrom units, A.-U.) so that I also contemplate this two color system of operation, in which case only two fields of scan would be needed at the iconoscope for each full "frame," and the necessary co-ordination of colors at the receiving station, and correct interpretation thereof, could be effected with a single interlace at the receiving kinescope, and without need of any line change in the receiving equipment. Of course in this case the sending station would also be equipped to operate with only the two colors.

Instead of the segmented disk arrangement just referred to for the iconoscope control at the sending station the following arrangement may be used:

Various photosensitive materials are known which may be used in the detecting system of the iconoscope of the sending station. These various materials are sensitive to various wave lengths, and in the case of each such photosensitive material a curve may be plotted showing the photosensitivity variation with respect to incident wave length. Each such curve rises from a low point for the shorter wave lengths to a peak, and then falls again to a low point at the higher wave lengths beyond the location of such peak. It is possible to select three such photosensitive materials, suitable for use in connection with a detecting plate of the general type of the Zworykin plate, such three materials having peaks corresponding to the three primary colors selected for the system, and the descending portions of these curves overlapping in such manner that a transition from color to color is effected over the entire visible range of the spectrum. By providing a detecting plate of the Zworykin type, having its photosensitive face provided with narrow bands or lines of these three photosensitive materials in proper alternation, it is possible to provide an arrangement in which the following functions are produced:

As the scanning beam of the iconoscope travels along a selected line of scan, corresponding to one of these narrow bands of photosensitive material, signals will be delivered of intensity corresponding to the intensity of light impinging on such band, and of that color to which such band is most greatly responsive. On the assumption that the kinescope of the receiver is properly synchronized for color, the intensities of the translation occurring in the kinescope will correspond to such changing signals from the sending station, with the result that the proper color band or line of the kinescope will appear to the observer and with variations of intensity of illumination corresponding at every point to the intensity of the corresponding color of the image being translated. Of course when another of the narrow bands or lines of the iconoscope is next scanned, the signals then delivered will be dependent on the photosensitive material of such other band or line, and therefore will correspond to the color to which such band or line is most sensitive photoelectrically, and will be of intensity varying from position to position, as the scanning proceeds. It will also be seen that correct color interpretation may be effected by use of such a "band" type detector plate of the Zworykin type, when scanning is transversely or across the lines or bands of the iconoscope, it being assumed that the electron beam movements of the kinescope of the receiver are of like nature. An important feature of my present invention relates to improved means to indicate the condition of color synchronism of the replica produced by the kinescope of the receiver and its color, with the colors of the object on which the replica is based.

The Zworykin type of iconoscope includes a photosensitive plate upon which the image to be scanned is brought to focus. This type of unit is well known and widely used in this art. It is here noted that in the usual type of Zworykin plate both the light beam which produces the image to be scanned, and the electron scanning beam act on the same face of the detector plate as above described and presently used. I contemplate, as a part of my present improvements, the combination of any suitable arrangement for subjecting the particles of such a detector plate to the three primary colors (or to two of them), under such control that the photosensitive particles are affected by the intensities of such primary color effects in regular order, together with a receiver including the linearly produced primary color lineations which are subjected to the translating electron beam in the same order as the order of influence of the scanning beam of the iconoscope upon the photosensitive particles of the detector plate.

My invention also includes various improvements in both the receiving equipment, especially the kinescope thereof and the viewing screen, as well as improvements in the iconoscope element of the sending equipment. Thus, I have disclosed and shall hereinafter describe a form of the detector plate of the Zworykin type in which the light image to be scanned is formed on one face of the detector plate, and the scanning electron beam acts on the opposite face of such detector plate. In this form of detector plate construction the central portion thereof comprises the conductor whose potential varies in response to the restoration of electrons to the photosensitive particles, according to the Zworykin principle. In this improved form of detector plate it is also possible to make use of a color screen located between the incoming light beam and the photosensitive particles, such screen being provided with narrow bands or lines of transparent material of the three primary colors in succession. With this arrangement the particles of photosensitive material lying behind each such transparent colored line or band are subjected to light of the color transmitted through such line or band, and of intensity corresponding to the intensity of such color included in the color of light arriving at the detector plate at the location of such photosensitive particle. By this means the scanning operation may be conducted without the need of a rotating three color segmental element such as hereinbefore referred to.

As another improvement in the form of the detector plate of the iconoscope I also contemplate the provision of an arrangement in which the photosensitive particles are colored or otherwise treated in such manner that light arriving against each of such particles is of a color range of one of the three primary colors, such arrangement also being such that it is not necessary to provide the rotating three color segmental disk.

The widths of the translated lines shown on the viewing screen of the kinescope should not be great enough to prevent satisfactory showing of detail of the image, nor to present objectionable "lines" to the view of the observer. Under the current specifications of the F. C. C., of 525 lines of scanning and a like number translated in the receiving kinescope, the spacing between the lines shown on the viewing screen will depend on the vertical dimension of that screen. If that vertical dimension should be as much as 20 inches, the spacing of the centers of the translated lines would be approximately 26 lines per inch. Of course with a smaller viewing screen this spacing would be proportionately smaller. For example, for a vertical dimension of 16 inches this spacing would be approximately 32½ lines per inch. With the three primary colors repeated every third line it is evident that the spacing between consecutive lines of the same color would be approximately one-tenth inch (for a viewing screen of 16–20 inches vertical dimension). It is to be noted, however, that the viewed bands are colored and that successive bands will merge or blend with each other so that such spacing is not objectionable when viewed from the usual viewing distance. It is also to be noted that when using a viewing screen provided with successive bands of fluorescent materials which fluoresce to produce emitted lights of different colors, each such band will actually emit a range of colors within the visible range, which range of colors is of corresponding wave lengths; and that the intensity of the emitted light for such material rises from a very small value for wave lengths less than its peak, to a maximum intensity for wave lengths corresponding to such peak, and then again falls to a very low value for wave lengths greater than such peak intensity wave length. Therefore, by selection of fluorescing materials of proper kinds it is possible to produce such overlaps of intensity of emitted colored lights that the blending above referred to will be much augmented to the viewer of the screen. This fact will further reduce the objection to use of translated bands of such widths as just above referred to.

It is here noted also that such fluorescing materials will fluoresce when excited by wave lengths over a band of some width, such as the wave lengths of the electron translating beam of the kinescope; and that when so excited these materials emit wave lengths greater than the exciting wave length. Also, that it is possible to select materials which will all be properly excited by substantially the same wave length (that of the electron beam of the kinescope), but will emit wave lengths for the desired three primary colors. Thus it is possible to secure the desired function of producing the three primary colors by direct excitation by the one electron beam of the kinescope.

Various means are suggested for satisfactory production of the color lineated screen of the kinescope, and the following are suggested as being satisfactory for this purpose:

Generally the viewing screen of the kinescope is of a non-flat surface both inside and outside. In order that the most accurate interpretations, both of color and form shall be produced it is desirable that the lineated element of such screen be brought into direct juxtaposition or contact with the phosphor surface or deposit of the kinescope. By this means errors due to refraction are substantially eliminated, and sharp replicas are produced on the screen. It is also desirable to use a non-flat inside surface of the phosphor excited by the electron beam so as to facilitate keeping the beam in the same focus on said surface when scanning all portions of the surface. When the presently accepted form of kinescope is used, having a non-flat inside face for the viewing screen, difficulties are presented in accurately ruling such non-flat surface with narrow bands of the selected colors of dye-stuffs or other transparent colored materials, keeping in mind the fact that these lineations must be either straight across the viewed field (or vertically thereof), if the paths of electron beam are straight across such field. It is intended of course that each such lineated line shall be of the same form as the path of travel of the electron beam traversing that section of the field in order that correct color registry shall occur during complete beam translation. One manner of producing such lineated screen is the following:

A thin sheet of suitable plastic or other material (transparent) is first ruled with the desired lines in proper color alternations, over the necessary area, while such sheet is securely retained in flat condition. Having done this such sheet may then be trimmed to proper size to correspond to the area to be lineated, and then this sheet may be heated and formed over a forming die of the proper surface contour to exactly conform to the form of the inside surface of the kinescope window against which such lineated sheet is to be sealed. In such forming operation the width (and, if necessary, the length) of the plastic sheet is slightly deformed by exerting tension along its opposite edges, in varying degree of such tension along such edges, if necessary, so that certain portions of the sheet are stretched slightly to thereby slightly modify the distances between the adjacent lineations, with more distance modification at some portions along the lines than at other portions. In other words, during the forming operation (to conform the sheet to the configuration of the inner surface of the kinescope window or a reversal of such configuration), the lineations will also be brought to exact relative position so that when such formed sheet is afterwards set into place against the inside surface of the kinescope window each color lineation will exactly register with a traverse of the electron beam. Then such sheet may be set into such placement and secured by a thin cement treatment around its edges and within the envelope of the kinescope. Thereafter the proper phosphor may be deposited on the inside (lineated) face of such sheet according to well understood principles now currently in use or as slightly modified to meet the conditions imposed by the presence of such lineated sheet. If desired the lineated sheet may be treated with a thin deposit of suitable protective but transparent material prior to the deposit of the phosphor, to prevent any interaction between the material of the sheet or the dye stuffs used, and the phosphor.

Alternatively, the following procedure may be used:

The inside surface of the window portion of the kinescope may be coated with a coating of polychromatic light sensitive emulsion, for photographic reception, such coating being photographically responsive to all three of the colors of the primary color selection used. A carefully prepared master sheet of transparent material is also prepared of configuration to set evenly against the inside surface of the kinescope window, with good contact over all of such surface to be lineated; and this master sheet is provided with carefully prepared rulings or narrow bands of the three (or two) primary colors on its convex surface so that when such master sheet is set into place against the inside surface of the kinescope window good contact will be produced between these colored lineations of the master sheet and the inside photographic emulsion surface already referred to. Then an exposure of suitable polychromatic light may be made so that such photographic emulsion will be exposed through this master sheet, thus reproducing the colored lineations of the master sheet photographically on the emulsion of the inside face of the window. Of course proper developing and fixing operations will also be used to bring out the colors thus photographed onto the inside surface of the kinescope window, and to fix said colors, and thus to produce the proper lineated screen on the inside surface of the window photographically. Thereafter the phosphor may be deposited on the inside surface of this photographically produced lineated screen according to well understood processes; and if desired or needed a deposit of transparent film may be sprayed or otherwise formed on the inside surface of the lineated screen (after it has been produced photographically), to protect such screen against interaction from the material of the phosphor during the phosphor deposit or afterwards. Also, if desired the very thin film of aluminum may be deposited on the inside face of the phosphor according to well understood operations currently in use.

It is here noted that both of the foregoing methods of producing the lineated screen on the inside surface of the kinescope window are well adapted to use in connection with currently used methods of manufacturing kinescopes which are provided with metal bodies and glass windows sealed to the front edges of such metal bodies. In such cases the lineated screens may be formed on the inside surfaces of the window sections before said sections are sealed to the metal bodies. Thereafter the said window sections may be sealed to the metal bodies, by use of such degree of heat as may be necessary applied around the edges of the parts; and if necessary the central or body portions of the window sections may be retained in properly cooled condition during such sealing operations.

A further alternative method of producing the desired lineated screens on the inside surfaces of the kinescope windows is as follows:

By forming the front or window section of the kinescope (of transparent material such as glass), with a flat back or inside surface such surface may be readily ruled by a direct ruling operation, to produce the desired colored transparent lineations thereon. Thereafter the desired deposit of phosphor may be made on such lineated screen (with previous protection of the screen by a thin deposit of transparent protective material as already suggested); and this flat surface window may then be sealed to the front edge of the metal body of the kinescope as already explained with respect to the other forms of construction.

Of course, in any of the above suggested methods the deposit of the phosphor may if desired be made after the window section has been sealed to the metal body of the kinescope.

Various other modifications of constructions, of both the kinescope screen and the iconoscope detector plate, are hereinafter illustrated and will be described in detail.

Reference has previously been made herein to the so-called R. C. A. system of three color operation in which the signals received are interpreted on the viewing screen as a series of "dots" of the three primary colors, such dots being regularly spotted over the surface of the viewing screen (by the electron beam or beams), the dots being of the proper intensities when so spotted that the correct replica is produced on the screen, and of the correct color interpretation at each point. According to this system of operation the dots are placed or formed on the viewing screen as four "fields." Each field comprises dots spotted along alternate horizontal rows, the dots thus spotted being successively of the three colors, and the alternate rows thus spotted being successively displaced lengthwise or across the screen a distance equal to one and one-half times the dot spacing. According to this system of operation, also, the first field comprises dots spotted along the odd numbered rows, the second field comprises dots spotted along the even numbered rows, the third field comprises dots spotted along the odd numbered rows (but displaced endwise along such rows an amount equal to one and one-half dots from the originally spotted dots), and the fourth field comprises dots spotted along the even numbered rows (but displaced endwise along such rows an amount equal to one and one-half dots from the originally spotted dots). The spotting of all four of these fields of dots serves to produce a fully translated replica on the viewing screen, and of the correct colors at all points (within the ability of such an arrangement to produce correct color interpretation depending on the size of the dots spotted).

According to the foregoing system there are produced 241 dots along each horizontal line of translation. Of course the actual distance between dot centers will depend on the total horizontal dimension of the viewing screen on which such dots are spotted. This system is also extremely complex, requiring very highly specialized forms of kinescope constructions, and complex electronic circuits. The sending equipment is of a like degree of complexity and fineness.

One of the objects of the present invention has been stated to be the provision of receiving or viewing means which is capable of receiving and interpreting signals delivered according to this "R. C. A." system, as well as according to the so-called "Columbia" and other systems, provided that the signals are based on linear scanning at the sending station. My improvements are capable of receiving and correctly interpreting in color signals sent out according to this R. C. A. "dot" system, provided that the lineations (colored) of my viewing screen are extended vertically, or at right-angles to the direction of translating movement of the electron beam of the kinescope. In other words, by use of a screen having lineations at right-angles to the direction of translating movement of the electron beam of the kinescope (that is, at right-angles to the direction of scan in the sending iconoscope), and by providing a correct spacing of the lineations, or a correct total number of such lineations, I am able to receive and correctly interpret the signals received from such a station sending signals according to the R. C. A. or "dot" system, and am able to produce a correct replica in color on my improved viewing screen. I shall hereinafter show how the rulings of my improved form of viewing screen are able to effect this result with proper synchronization of color of the replica with the colors of the object being replicated.

At this point I may mention that since this "dot" system as currently being practised employs 241 dots along each row, and since alternate rows are displaced endwise by the amount of one and one-half dots, I am able to secure such correct color interpretation as just above referred to, by use of my improvements, for such "dot" signals, when I provide 482 lineations, being double the number of dots in each row. These 482 lineations would be the three primary colors in regular succession according to the principles hereinbefore set forth. Of course the number of lineations needed to correctly interpret such "dot" signals to produce a correct and complete replica would depend on the number of such dots sent out for each row, and as prescribed by the rulings of the F. C. C. or other competent authority.

Other objects and uses of the invention will appear from a detailed description of same, which consists in the features of construction and combinations of parts hereinafter described and claimed.

In the drawings:

Figure 1 shows a schematic layout of a typical sending station equipped with the Zworykin type of iconoscope, and with a three color segmental disk interposed in the optical system, and intended for line scanning over the entire area of the detector plate while each of such color segments is in the line of the optical system;

Figure 2 shows a face view, in schematic form, of the detector plate of the arrangement of Figure 1, and shows the various lines of transverse scan, on the basis of scanning every third line location on the first scan, then an interlace on each scanning movement, and finally a second interlace on another set of scanning movements, so that all areas of the detector plate are scanned by three sets of scanning movements of the electron beam, corresponding to the interposition of the three colored segments of the disk into the system, one after the other sequentially;

Figure 3 shows a schematic layout of a typical receiving system adapted to receive and interpret signals from the sending station of Figure 1, and this figure shows transverse lines on the viewing screen corresponding to the translated lines controlled by the emitted signals of the sending station; and in this figure there are also shown schematically three locations where the three colored patches will be produced to indicate that color synchronization has been produced;

Figure 4 shows a face view, in schematic form, of the viewing screen of the receiver of Figure 3, and it shows the parallel lines corresponding to the sets of lines or bands of the three primary colors; and this figure also shows the order of scanning to produce complete color scanning when movement of the electron translating beam is parallel to the color lines, and with two sets of interlaces corresponding to the interlaces of the sending station scanning and this figure also shows the color synchronizing patches;

Figure 5 shows another schematic layout of another typical form of sending station equipped with a modified form of detector plate wherein provision is made for direct color control of the successive lines scanned by the electron beam, and without need of providing a segmented disk with colored segments, as in the arrangement of Figure 1; and in this figure there is also shown, schematically, means to control the position of the scanning beam bodily, so as to ensure correct registry of such beam with the several bands which are to be scanned on the detector plate;

Figure 6 shows a face view, in schematic form, of the detector plate usable in the form shown in Figure 5, such detector plate being provided with the minute photosensitive particles with which there is intermingled dye stuffs or the like to ensure response of such particles to incident rays of the primary colors, such dye stuffs or the like being located along the successive bands of scan as indicated in the present figure; and in this figure there are also shown, schematically, three areas which will be responsive to the three primary colors, to deliver "synchronizing" signals for reception by the receiver, to produce correspondingly colored areas of the viewing screen, when color synchronization has been effected;

Figure 7 shows a section taken on the line 7—7 of Figure 6, looking in the direction of the arrows; and this figure shows an arrangement in which there are placed colored bands or lines of dye-stuffs just in advance of the minute particles of photosensitive material of the detector plate, so that bands responsive to the three primary colors will be produced;

Figure 8 shows in face view, in schematic form, another form of detector plate to be scanned by the electron beam of the iconoscope, such detector plate being provided with narrow bands or lines of photosensitive materials which are most responsive to the three primary colors, in succession, and such detector plate being also provided with three patches of such photosensitive materials located at positions such that corresponding colored patches will be produced on the viewing screen when the reception is synchronized for color;

Figure 9 is a section taken on the line 9—9 of Figure 8, looking in the direction of the arrows;

Figure 10 shows a series of curves relating the photosensitivity of three materials in arbitrary units, as the incident wave lengths are varied, such materials having peaks of sensitivity corresponding generally to the three primary colors, and the curves of sensitivity of such materials descending in successively overlapping fashion so that continuous photosensitivity throughout the entire visible range is effected;

Figure 11 shows schematically a detector plate of an iconoscope adapted to deliver signals of strength corresponding to the intensities of the bands of color which are scanned; and this figure shows how it is possible to secure complete three color scanning, with successive parallel lines for the three primary colors, and by use of a single interlace, corresponding to two complete vertical scanning movements of the scanning beam;

Figures 11, 12, 13, 14, 15, 16, 17:
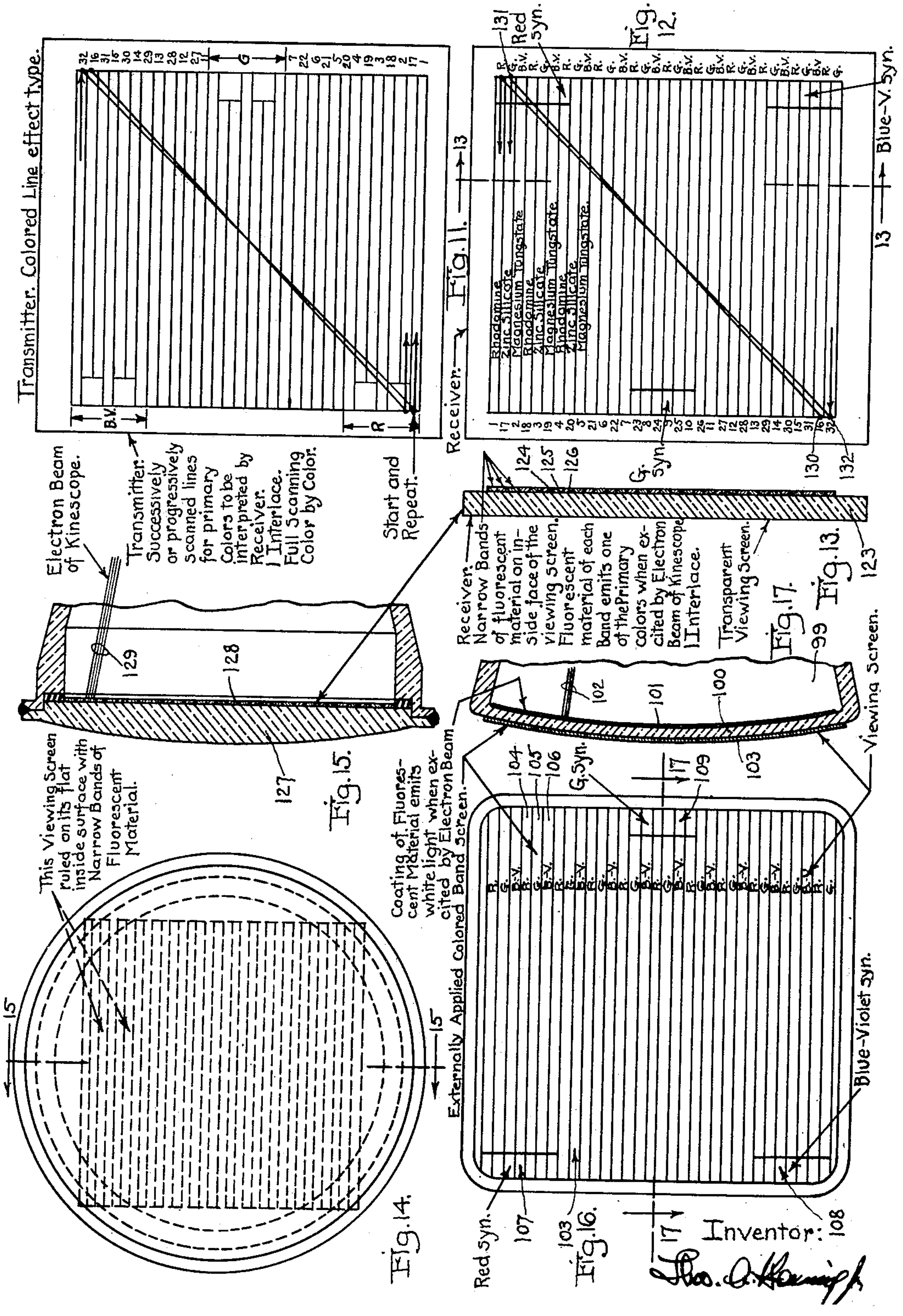
Figure 12 shows schematically a viewing screen adapted to fluoresce for production of the three primary colors, such screen being provided with narrow parallel bands of fluorescing materials which will of themselves fluoresce to produce the three primary colors, all of said fluorescing materials being excited by substantially the same wave lengths of the translating beam of the kinescope.
Figure 13 shows a section taken on the line 13—13 of Figure 12, looking in the direction of the arrows.
Figure 14 shows a face view of a typical viewing screen provided with horizontal narrow bands or lines corresponding to the three primary colors.
Figures 17A, 18, 19, 20, 21, 22:
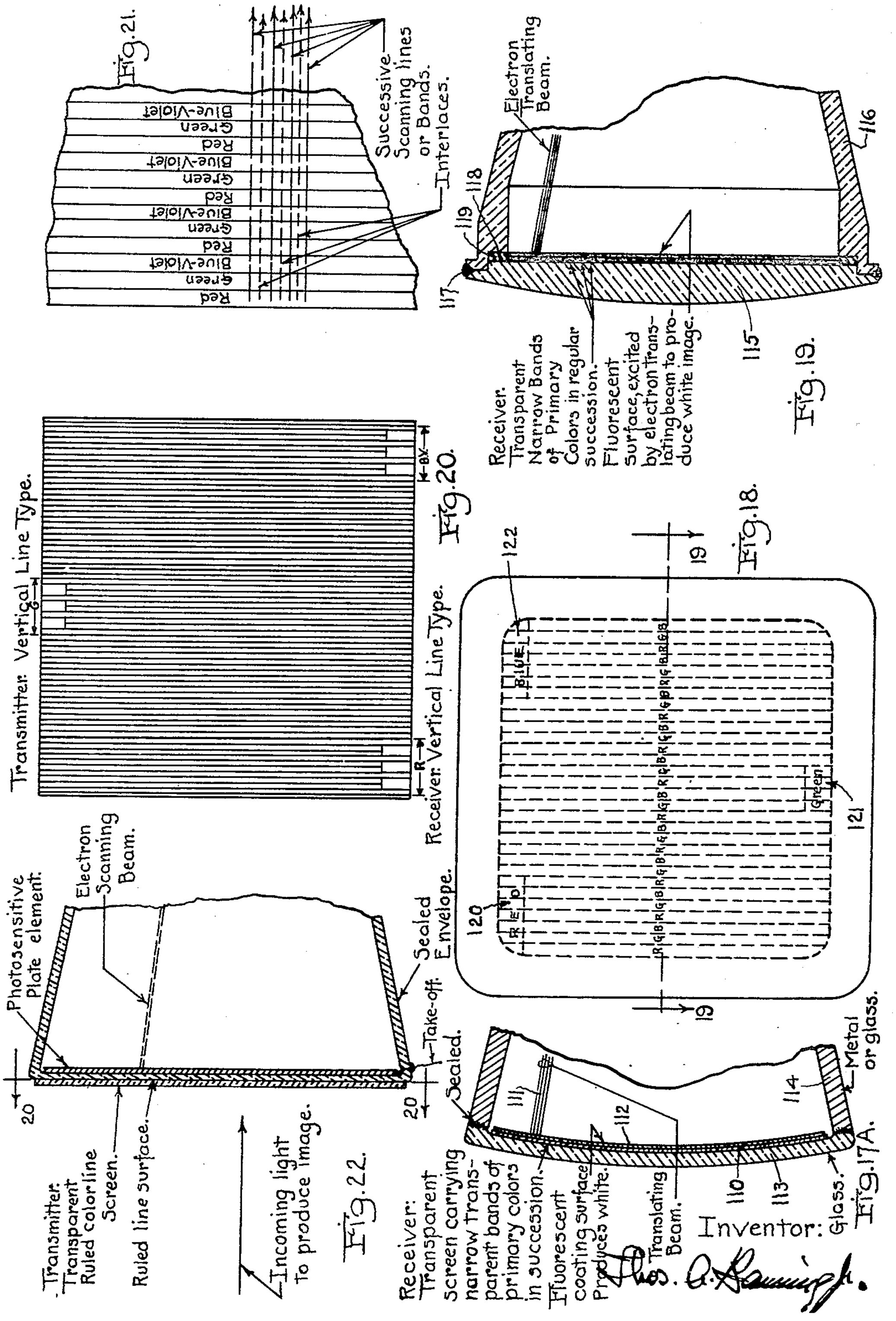
Figures 23, 24, 25, 26, 27, 28, 29:
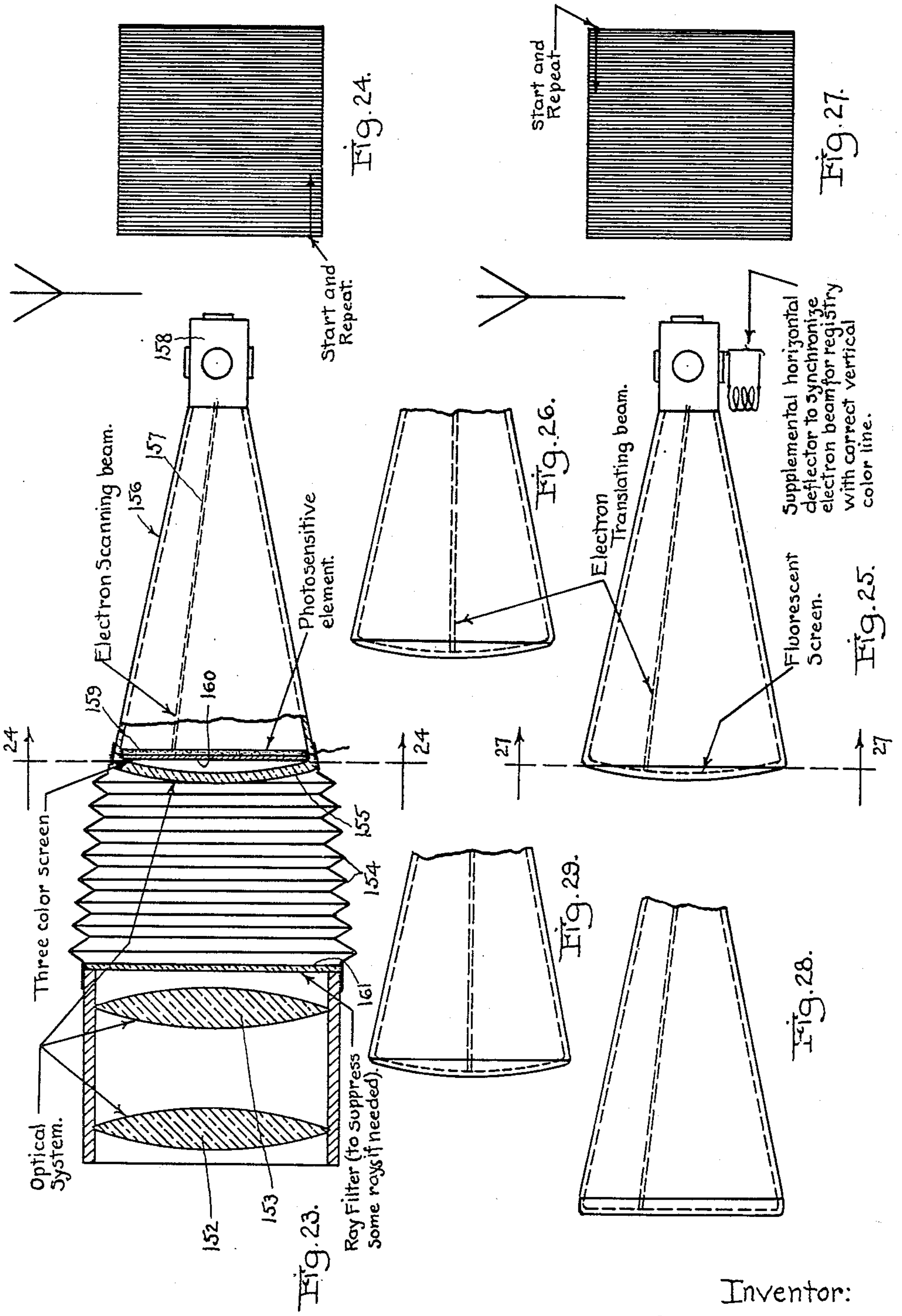
Figures 30, 31, 32, 33, 34, 35:
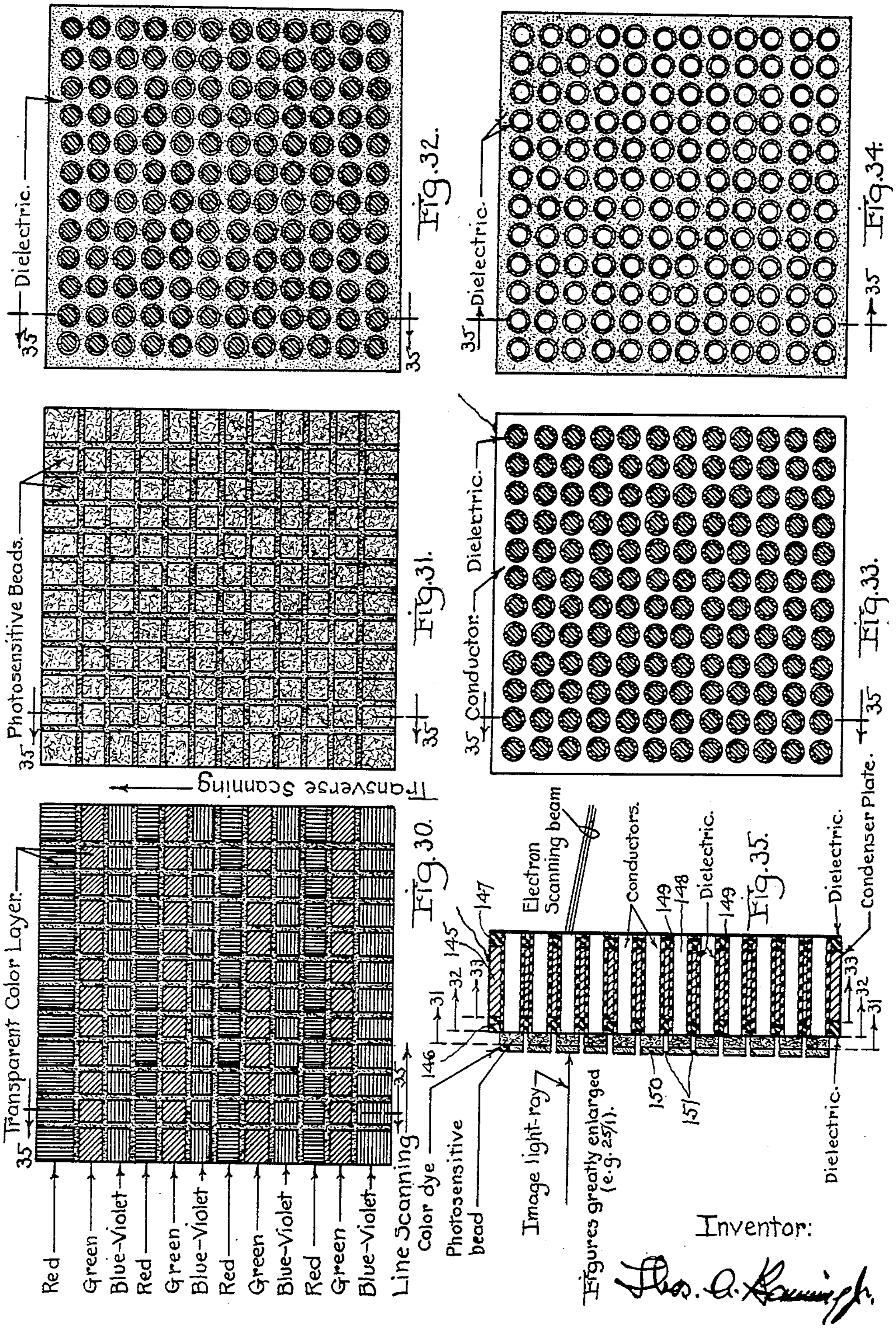

Figure 15 shows a section taken substantially on the line 15—15 of Figure 14, looking in the direction of the arrows; and this figure shows a modified form of kinescope envelope or tube having a front or viewing end section which is provided with a flat inside surface on which the narrow bands of the different kinds of fluorescent material may be deposited prior to assembly of the kinescope envelope; such front section being then sealed to the body of the kinescope envelope by fusing the outer edge of the front section to the outer front edge of the body of the kinescope envelope;

Figure 16 shows a front end view of another form of kinescope viewing screen of present conventional form, which is provided on its inner surface with fluorescing material which will fluoresce to produce white light; and said front end or viewing screen is also provided with a transparent screen placed against the front surface of such screen, and provided with the three sets of narrow colored bands of transparent material of the three primary colors in succession so that the image seen by the observer is properly affected by the light transmitted from the fluorescent material through such colored bands or lines and this figure also shows the patches at which the three primary colors will appear when color synchronization has been attained; tained;

Figure 17 is a section taken on the line 17—17 of Figure 16, looking in the direction of the arrows;

Figure 17A shows a section similar to that of Figure 17, but it shows a form of front end portion of the kinescope in which the window portion is of non-flat form, and is provided with the lineated screen of the three primary colors (or two) placed directly in proximity to the inside surface of the window, and with the fluorescent surface or coating located directly against the inside surface of such lineated screen;

Figure 18 shows another form of viewing screen embodying the present invention, being a face view of the same; and in this form the narrow bands or lines for the three primary colors are placed vertically instead of horizontally, the movements of the translating beam of the kinescope being horizontal and therefore intersecting these color lines in regular succession during each transverse movement of the electron beam and this figure also shows the patches at which the three primary colors will appear when synchronization has been attained;

Figure 19 shows a section taken on the line 19—19 of Figure 18, looking in the direction of the arrows; the front portion of the kinescope tube or envelope being provided with a flat inner surface on which the narrow bands of the three primary colors are first ruled in succession, after which the fluorescent coating is placed on the inside face of these transparent color bands, such fluorescent material being of a nature which will fluoresce to produce white light to be viewed through the transparent colored bands of the primary colors; the front section being fused or otherwise sealed to the body of the kinescope tube after preparation of the inner surface of the viewing screen as stated above;

Figure 20 shows schematically a detector plate which is intended for scanning transversely of the bands, the bands being vertical and the scanning being horizontal and this figure shows patches at which signals for the three primary colors will be emitted for use in producing color synchronization;

Figure 21 shows on enlarged scale as compared to Figure 20 a section of the detector plate, with the bands which produce signals for the three primary colors indicated, and this figure also shows the manner of scanning, first with movements leaving unscanned bands between these movements, and afterwards with an interlacing operation;

Figure 22 shows a section through the front portion of a scanning tube of an iconoscope, in which arrangement the detector plate is adapted to receive the light image on one face, the scanning beam acting on the opposite face of such detector plate; and in this arrangement a three color band or line screen is located in the path of the light which produces the image on this detector plate;

Figure 23 shows a section through a typical iconoscope arrangement in which the detector plate is of a form to receive the incident light on one face, and with the scanning beam acting to scan the opposite face of such plate; and in this arrangement the three color screen is placed within the envelope of the iconoscope and in direct contact with the face of the detector plate so as to ensure good line contact and control;

Figure 24 shows schematically the ruled screen of the arrangement of Figure 23, being a section taken on the line 24—24 of Figure 23, looking in the direction of the arrows;

Figure 25 shows schematically a receiving kinescope for use in connection with the arrangement shown in Figures 23 and 24, being provided with vertical color lines, with horizontal translation of the electron beam; and this figure shows in schematic form a control element to ensure synchronization of color;

Figure 26 shows in fragmentary form the plan of the front portion of the kinescope shown in Figure 25;

Figure 27 shows schematically the three color lined screen of the viewing screen of the arrangement of Figures 25 and 26;

Figure 28 shows schematically the front portion of a kinescope embodying the present features, being an elevation of the same, and the said front portion in this case is provided with a cylindrical form, the cylinder thereof being vertical and parallel to the color lines, this arrangement adapting itself well to accurate ruling of the color screen on said front end of the kinescope;

Figure 29 shows a plan view corresponding to Figure 28;

Figure 30 shows a face view of a form of detector plate for use in the iconoscope, which detector plate is provided with photosensitive beads facing in one direction at one side of said plate to receive the incident light arriving upon that face of the plate, said beads being arranged in lines or rows corresponding to the scanning movements of the scanning beam, the photosensitive beads of this arrangement being isolated from each other electrically; and detector plates of the form shown in this figure may be scanned either parallel to the several lines of color or transversely thereof;

Figure 31 shows a plane section beneath the coating of transparent color, showing the photosensitive beads which are distinct from each other, according to the Zworykin principle; this figure being a section taken on the plane 31—31 of Figure 35, looking in the direction of the arrows;

Figure 32 shows a plane section at the plane of the sheet of dielectric on the image face of the detector plate; this figure being a section taken on the plane 32—32 of Figure 35, looking in the direction of the arrows;

Figure 33 shows a plane section at the plane of the conducting plate or sheet, at the image face of the detector plate; this figure being a section taken on the plane 33—33 of Figure 35, looking in the direction of the arrows;

Figure 34 shows a face view of the detector plate, looking at the electron scanning beam face thereof;

Figure 35 shows a cross-section taken on the lines 35—35 of Figures 30, 31, 32, 33 and 34, looking in the directions of the arrows.

Figures 30 to 35 are on greatly enlarged scale, of the order of 25 times natural size.

Figure 36:
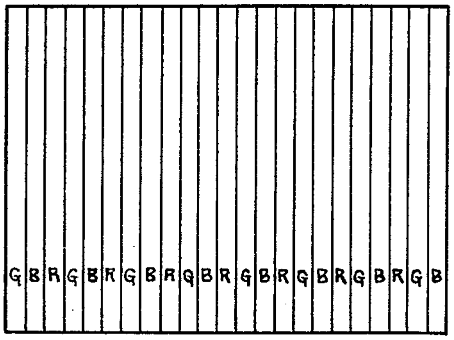
Figure 37:
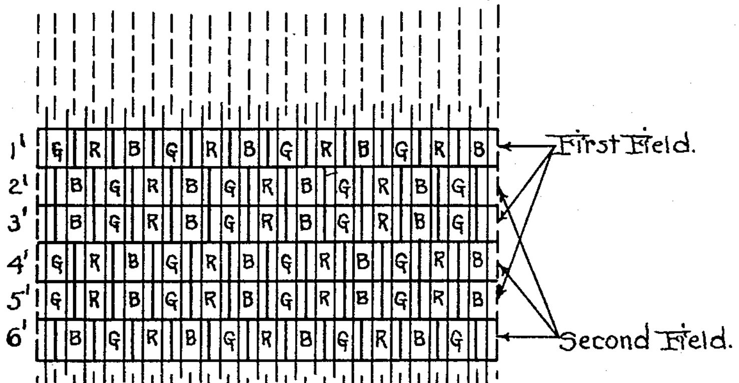

Figure 36 shows schematically a vertically lineated color screen of either the transparent colored line type or the "different phosphor type" intended for use with translating electron beams which move laterally or across the field;

Figure 37 shows schematically the so-called "R. C. A." or "dot" system of spotting the translated portions of the replica across the viewing screen; and this figure shows how the first and second fields of spotting are located with respect to each other, the first field comprising the dots of odd numbered rows, and the dots of each such row being displaced laterally or endwise of the pattern by the amount of one and one-half dots from the dots of the previous row of such field; and the dots of the second field comprising the dots of even numbered rows, and the dots of each row of this field also being displaced laterally or endwise from the dots of the previous row of such field, by the amount of one and one-half dots; and Figure 38 shows schematically the third and fourth fields of this "dot" system of spotting, the third field comprising the dots of odd numbered rows, and the dots of the fourth field comprising the dots of the even numbered rows; and in this case too the dots of successive rows of each field are displaced laterally or endwise from dots of the previous row of such field, by the amount of one and one-half dots; and in laying down the third and fourth fields the dotting is also such that finally the completed field, comprising all four fields of dotting, includes double the number of dots in each row as were originally spotted in such row, and the dots of the third and fourth fields are inter-spotted between the dots of the first and second fields previously laid down.

Figure 38:
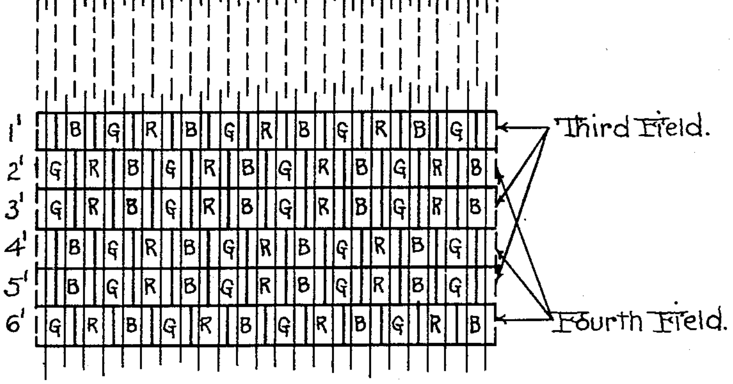

Figure 36 is also connected to Figures 37 and 38 by broken lines corresponding to the lineations of the screen of my improvements, so as to show how such a lineated viewing screen may correctly register with the dots laid down by such a scheme as this "dot" scheme, so as to produce a correct color replica of the image sent out, and even without need of using means to produce colored rays of light striking the viewing screen and coming from three differently colored light sources. Figures 36, 37 and 38 show how by the use of my present improvements it is possible to receive signals coming from a sending station equipped to send signals for color television on the "dot" system, and by the use of a simple form of receiving kinescope having a single electron beam which will respond to the incoming signals to produce the necessary dots, provided that such receiving station also be equipped with a lineated color screen as herein disclosed, with its lineations properly related to the spacings of the dots produced by such kinescope beam, and when operating according to the "dot" principle shown in Figures 36, 37 and 38 use may be made of the color synchronization means already referred to and which will be referred to hereinafter.

Figures 1, 2, 3, 4:
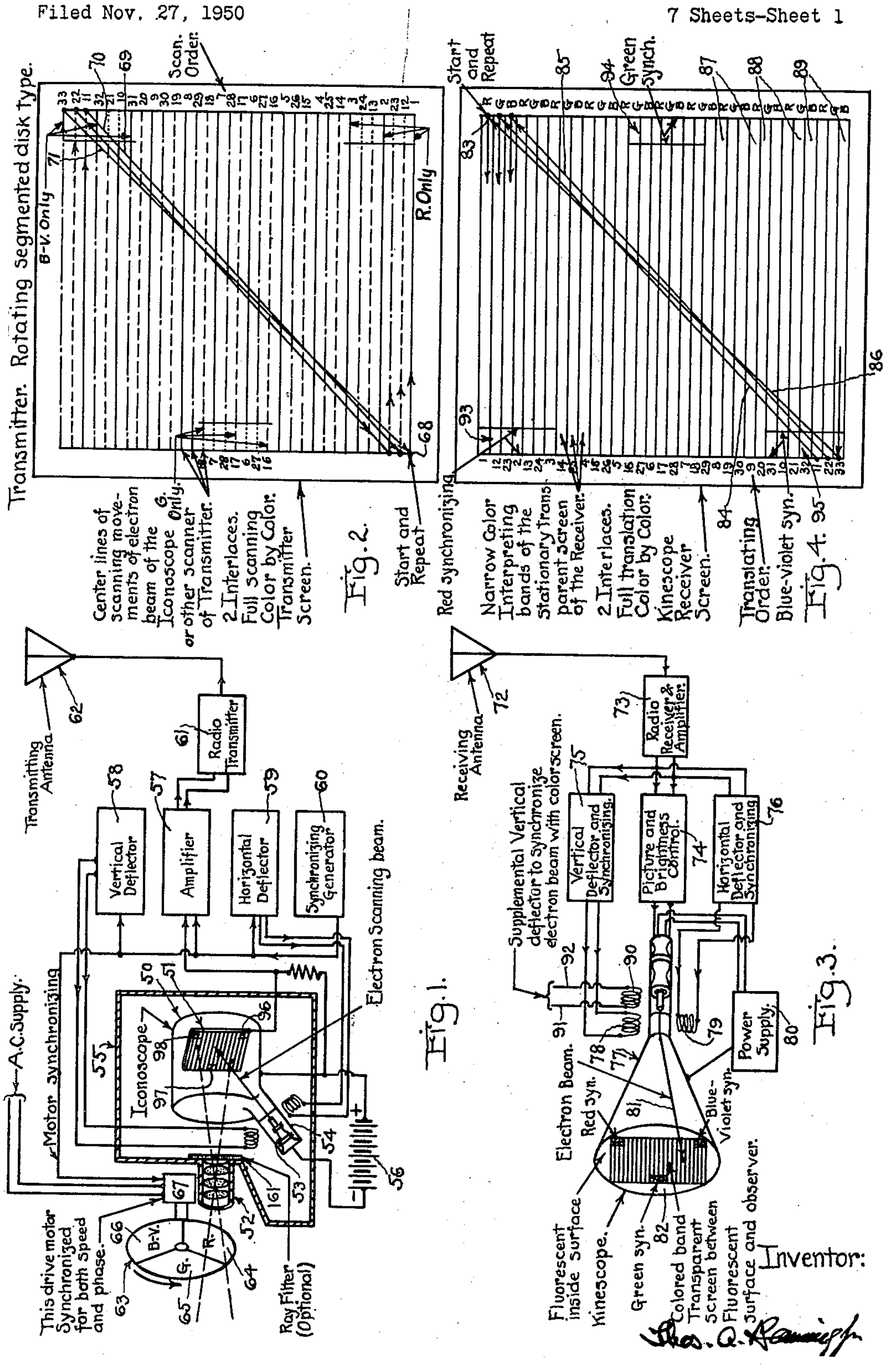

Referring to the drawings I shall first show and describe, more or less schematically, a simple arrangement embodying the features of my present invention. For this purpose reference may be had to Figures 1, 2, 3 and 4. Figure 1 shows schematically a simple arrangement for sending signals of regularly repeated kind, and of varying values, under such control that the strengths of said signals are determined by the intensities of points of illumination severally scanned by a scanning beam (generally an electron beam) which is regularly and repeatedly scanned over the surface on which the image to be examined is brought to focus. This scanning means (in the iconoscope) is so controlled that its scanning beam travels across the focused image many times during the scanning of each "frame," such frame comprising a field which is complete from top to bottom of the image, and from side to side of said image. These cross or lateral travels of the scanning beam are produced at regularly spaced intervals, and according to present regulations of the F. C. C. there are produced 525 such lateral or crosswise scans from top to bottom of the image, each scan being of the full width of the image or field being analyzed. During this scanning process the iconoscope beam so acts that the intensities of signals being sent out varies from point to point with extreme rapidity, so that many such variations of intensity of the delivered signals occur during each traverse across the image, and these variations thus occur during all of the traverses needed to completely scan the field being analyzed.

The lateral movements of the scanning beam are exactly produced and controlled by suitable control units of the sending equipment, generally including means to produce a saw-tooth form of voltage wave, by means of a saw-tooth generator, and the slanting line of voltage value thus produced serves to control the lateral shifting of the electron beam of the iconoscope from end to end of each line or row of scan, this saw-tooth generator making one complete voltage variation cycle during each line scan, and then returning the voltage to its original value for commencement of the next line scan. The regularity of rate of scanning movement therefore depends on the exactness with which this saw-tooth generator performs its voltage variation function. If the slanting line of voltage change is straight the rate of movement of the beam across the image will be constant, producing equal increments of lateral movement for equal increments of time lapse. If on the contrary the rate of voltage change is non-uniform, disclosed by a non-straight slanting line of voltage of this generator, there will be produced unequal increments of lateral beam displacement for equal lapses of time. Another saw-tooth generator is also provided for controlling vertical movements of the scanning beam. This generator produces a varying voltage which serves to cause the scanning beam to execute one complete vertical movement during each voltage change along the slanting line of such saw-tooth voltage generator, after which the voltage delivered by this generator returns to its original value, and the scanning beam restores to its original vertical position, ready for another vertical movement under control of such slanting line of voltage delivered by such second saw-tooth generator. Here, too, the spacing of the lines of scan from each other, both at commencement of each such line, and also along its course, will depend on the exactness with which the slanting portion of this saw-tooth generator performs its function of voltage variation.

Here it is mentioned that since the first-mentioned saw-tooth generator must execute one complete variation of voltage for each lateral scanning movement of the beam, it is evident that the frequency of operation of this first mentioned generator will be greater than the frequency of the second mentioned generator by a ratio depending upon the number of lines scanned during each frame, presently prescribed by the F. C. C. as 525. It is also true that these saw-tooth generators operate with a very close tolerance of voltage variation away from such straight line slant as we have above mentioned, so that in actual practice the scanned lines vary only slightly from true straight lines, and also so that the spacing between the lines is very constant and varies only slightly along any given space between two consecutive lines. As the technique for production of control equipment improves any such tolerances from exactness of line scanning will be reduced, with consequent improvement of the application of the features of my present invention, as will presently appear in more detail.

The foregoing general principles of scanning the image focused in the iconoscope are fundamental, and are applicable to scanning operations generally. When the operation is monochrome or one in which "black and white" transmission and reproduction are sufficient at the receiving end of the system, the strength of the signals delivered from point to point of scan varies directly according to the effect on the detector plate of the iconoscope produced by the signals received thereon, and no means is provided to discriminate as between strength effects produced by various colors brought to such focus. On the contrary, when it is desired to transmit signals which shall take account of color variations over the face of the field on which the image is brought to focus, means must be provided to so control and vary said signals that their strength at various positions of the scanning beam during scan shall also take into account the color (primary) then being most influential on the operation.

Fundamentally both the color segmented rotating disk system and the R. C. A. "sampling, mixing and adding" system are similar in this, that both employ means to scan the image on the iconoscope detector plate by lineal scanning, each line of scan extending across the iconoscope detector plate horizontally, and each system provides means such that the successive scans across the image are substantially parallel to each other, and the thus scanned field extends from top to bottom of the field scanned. Furthermore, both of these systems are also similar in this, that in each case the beam control effects lateral scanning of alternate horizontal lines alternately, that is, during one scanning operation from top to bottom of the field all odd numbered lines are first scanned, and then on the next succeeding field operation all of the intermediate or even numbered lines are scanned to produce an "interlace" field or scanning. Thus two complete field operations serve to completely scan the entire field, filling in the lines non-scanned on the first operation by the second operation. In both of these systems, also, the strength of signal emitted by the electron beam control of the iconoscope (or iconoscopes) varies according to color control as well as strength of the light received by the detector plate at the point of scan. In both of these systems, also, each point or minute area of the image which is examined by the scanning beam emits its strength signal while at the same time the location being then examined on the detector plate is definitely known and is signalled, and that definitely known location is also definitely known as to the color there being examined.

When using the "line color" system, the color being the same, or within one color range, during the complete scan of each line, the strength of the signal emitted and transmitted to the receiver is variable over the length of each line so scanned under such color or color range, according to the wave lengths of light impinging on the iconoscope along the line being thus scanned. Then, when synchronized, the electron beam of the kinescope translates along the viewing screen of such kinescope on a line definitely synchronized with the line then being scanned by the iconoscope of the sender, so that by providing a colored line in or as a portion of, or properly related to the line thus traversed by the kinescope electron beam, there will be produced along such line an exact replica of the changing strength of the color or color range then being scanned by the iconoscope of the sender. Thus a faithful interpretation of color as well as strength will be produced on the viewing screen of the receiver, along such line. By this means it is possible to secure correct color interpretation as to place or location on the field of the replica, as well as correct strength interpretation at each place or location thus reproduced on the replica field. But the securing of such correct color interpretation requires that the receiving equipment shall be "color synchronized" with the sending equipment.

When the operation is according to the "dot" system, as each line is scanned all of the three primary colors are successively used in proper rotation or succession, so that the iconoscope (or iconoscopes) of the sender successively send out signals which are of strength according to the successive portions of each line scanned, and are of or dependent on the successive primary colors occurring along the line so scanned and at the dot positions so signalled. Specifically, according to the so-called "R. C. A." system use is made of three iconoscopes each operating for one of the primary colors, and signals are delivered by these three iconoscopes in rotation, being so-called "high signals," and these successively sampled signals are mixed in regular order by a "mixer" and are sent out according to such order of mixing over a common signalling system. These signals are therefore of strengths corresponding to the successive "highs" so sampled, and of order of succession as determined by the sending "Adder" or mixer, so they are received by the receiving equipment under such conditions that said equipment will properly lay down said signals on the viewing screen.

Now the number of dots which is thus examined on the image across the field during each scan of the sending equipment is a specified number, and a like number of dots is reproduced by the receiving equipment for reproduction on the viewing screen thereof. Furthermore, these dots are at uniform spacing (within the tolerances already referred to), and the spacing of the dots thus reproduced on the viewing screen is also of like uniformity of spacing (within such like tolerances). According to the requirements of this "dot" system as now known it is necessary that the receiving equipment be provided with means to cause these dots to appear on the viewing screen as of colors corresponding to the dot colors being examined in the sending equipment. It is evident that this "dot" system does include the feature that the dots are of known spacing, or of known number across the field, that they are of known colors, and that they are of known strength. Also, that the colors are regularly repetitive along each line of scan and likewise the dots to be reproduced in the receiving equipment and on the viewing screen thereof are of like natures, both as to colors, strengths, and order of colorizing.

I am able to secure reproduction on the viewing screen of the receiver, a replica as to both color and strength of illumination, of the image being examined by the iconoscope equipment of the sender, by use of a lineated screen in conjunction with or as a portion of the viewing screen of the receiver, such lineated screen including lineations of number corresponding to the number of dots scanned by the sending equipment, and each lineation of the receiver being of color corresponding to the primary color with which it is synchronized by dot scan in the sending equipment during the scanning operation which is being reproduced by the receiver. Specifically this operation may be secured by placing my lineated screen of my receiver with its lineations crossing the lines of beam movement of the electron beam of the kinescope, instead of parallel as in the previously described operation. Then I provide my lineated screen for the primary colors used, and this screen provides the color lines of equal spacing (or of spacing according to the spacing of the signals to be received), and with said color lines of regularly recurring colors as used. But correct color reproduction at the receiver requires that the production at each signal for any dot location at the sending station, and of intensity dependent on the intensity of a primary color at the location of such dot, shall be accompanied by production of a kinescope electron beam strength at the receiving station corresponding to the intensity of the signal sent out at the sending station, and exactly synchronized as to location on the kinescope so as to impact the viewing screen on a lineation of the correct primary color.

Referring again to Figures 1, 2, 3 and 4, I have therein shown schematically the iconoscope element 50 having the detector plate 51 (of the Zworykin type), the optical system 52 by which the incoming rays are brought to focus on said detector plate, and the electron gun 53 located in the side-arm 54 of the iconoscope envelope. This iconoscope is shown as being housed in the camera housing 55. Suitable electronic elements are shown schematically, including the current source 56, the amplifier unit 57, the vertical deflector control 58 for controlling the vertical movements of the electron beam, the horizontal deflector control 59 for controlling the horizontal movements of the electron beam, the synchronizing generator 60, and the radio transmitter 61 which delivers the radio signals to the transmitting antenna 62. All of these elements are shown schematically, and may be of any suitable form to deliver the necessary radio signals for horizontal linear scanning of the Zworykin detector plate, with provision of controls for such scanning by interlaces, and so that the strengths of signals being emitted are based on the illumination of the Zworykin plate during the scans.

Included in this schematic showing there is also the three segmental rotor 63 including the three transparent segments 64, 65 and 66, for the three primary colors, a red, a green, and a blue-violet, indicated as "R," "G," and "B.-V." in the figure. This rotor is driven at constant synchronous speed by the motor 67, and a control is also provided for this drive such that the rotations of the rotor are properly harmonized and synchronized with the scanning operations currently being conducted. This control is such that during one scan of a "field" over the Zworykin detector plate 51 light of one color is passed by the rotor, the scanning of this field covering every third horizontal line or row of material to be analyzed, during the next scanning of a "field" over the Zworykin plate the previously non-scanned upper lines or rows are scanned, with passage of the next primary color of light through the rotor, and during the third scanning of a "field" over the Zworkyin plate the previously non-scanned lower lines or rows are scanned, with passage of the third primary color of light through the rotor. Thereafter the operation is repeated in the same manner, and with the colors passed by the segmental rotor being passed in the same order as originally, corresponding to the scanning of corresponding lines or rows of the Zworykin plate. Thus, for example, the first, fourth, seventh, and tenth rows will always be scanned under influence of red light, the second, fifth, eighth, and eleventh rows will always be scanned under influence of green light, and the third, sixth, ninth, and twelfth rows will always be scanned under influence of blue-violet light. During each such row scanning of course the strength of signals being emitted by the system will be varied according to the intensity of illumination of the Zworykin plate, at different points, as determined by the image currently being focused on said plate under the light being currently passed by that segment of the rotor then in line of light. Thus the emitted signals will be according to customary line scan (but with two interlaces), and in synchronism with the particular primary color then in registry with the light source.

In Figure 2 I have shown schematically a typical scanning sheet according to the foregoing principles of scanning operation of the sender. In this figure only eleven sets of scanning rows are shown, and each set includes three rows or lines, shown by the full lines, the broken lines, and the dash and dot lines. These lines indicate the center lines of the electron beam during its scanning movements. This showing is intended to indicate typical scanning operations for two sets of interlaces, one set of lines scanned being for each primary color. Of course these lines do not intersect, and they represent different adjacent narrow zones or bands of scan, so that in actuality each point of the image is subjected to scan under an individual light color condition, but since these zones or bands are very narrow (even when correspondingly shown on the viewing screen of the receiver presently to be described), sufficient detail, both as to color and as to form of the replica of the image scanned, will be produced, especially when the replica is seen from customary viewing range or distance.

In Figure 2 I have also shown, at the right hand edge of the field, the scanning order of the lines or rows scanned, and also the manner of transfer of the beam from the terminal location of each group of eleven lines to the commencement point of the next group of eleven lines. It should be remembered that the image appearing on the Zworykin plate is reversed and inverted so the starting point shown on that plate is at the lower left-hand corner as shown at 68 in Figure 2, and scanning movement is shown from left to right in that figure. From the end of line 11 (right-hand end) the return line 69 restores the scanning beam to the commencement of line 12, which is the first line of the first interlace; from the end of line 22 the return line 70 restores the scanning beam to the commencement of line 23, which is the first line of the second interlace; and from the end of line 33 the return line 71 restores the scanning beam to the commencement of line 1 for a repetition of the entire series of operations.

In Figure 3 I have shown schematically a receiver suitable to receive and translate the signals emitted by the sender of Figure 1, and according to the scanning order shown in Figure 2, just described. In Figure 3 the incoming signals received by the receiving antenna 72 are delivered to a radio receiver and amplifier, 73. From this unit suitable signals are delivered to the picture and brightness control 74, to the vertical deflector and synchronizing unit 75, and to the horizontal deflector and synchronizer 76. The kinescope 77 may be of conventional form (but modified according to the color screen features presently to be described, and possibly also to provide for a supplemental vertical beam control). The unit 74 is properly connected to the kinescope, and the vertical and horizontal beam controls 78 and 79 of the kinescope are suitably connected to the units 75 and 76 as shown. The power supply 80 may be of suitable form.

Such a kinescope as that shown in Figure 3 will deliver the electron beam 81 which strikes the inside surface of the viewing window 82 which is coated with suitable phosphor to produce a spot of light by fluorescence in well understood manner, and this spot is caused to execute horizontal linear traverses or translations corresponding to the line or row scans of the scanning beam of the iconoscope of the sender. These horizontal traverses of the kinescope beam are executed under control by the signals being received, and are therefore in harmony with the corresponding scans of the sender. This is true both as to lateral positioning of the traversing beam of the receiver, and as to the vertical positioning at which each traverse is executed. Of course the kinescope of the receiver is so arranged that the replica there produced is upright and in correct facing position (to right or to left as required). It is thus evident that at each instant the kinescope beam should be traversing a horizontal line or row exactly corresponding to the line or row then being scanned by the iconoscope of the sender, so that at all times the kinescope beam will be at a location corresponding to the then location of the iconoscope beam. Also, the brightness of the spot produced by the kinescope beam on the fluorescent viewing screen of the receiver is at all times in proportion to the brightness of the corresponding spot then under examination by the beam of the iconoscope of the sender.

With arrangements thus far described the replica produced on the viewing screen of the receiving kinescope would be a simple black and white replica, but otherwise would be an acceptable replica on the black and white basis. This is true even though the signals being sent out by the sending iconoscope are based on color scans produced successively by scanning images produced on the Zworykin plate by the three primary colors succesisvely, since the strengths of the signals sent out during scan along each line or row of the iconoscope vary according to the brightness at each point of such line scanned under such color. Such brightness will depend on two factors; First it will depend on whether or not the colored rotor segment then in register with the line of incoming light will pass wave lengths being received from the object being focused on the Zworykin plate at the image point then in question, and; Second it will depend on the strength of such waves received at such color segment and thence passed by transmission to the Zworykin plate focus at the point in question. If it happens that the color segment is proper to pass the wave lengths being received they will be passed on to the Zworykin plate at the point in question, but at a reduced brightness due to color absorption by the colored segment of the rotor. If such received wave lengths be close to the wave lengths of the color segment a high percentage of illumination will pass on to the Zworykin plate at the point in question, producing a strong signal. If, on the contrary, the wave length being received at the color segment is substantially different from the wave length of said color segment there will be a large percentage of absorption of illumination by such color segment, or possibly even a substantially complete blocking of all light transmission. In this case substantially no light will be received by the Zworykin plate at the point in question so that a very low signal value will be emitted by the Zworykin plate, or even no signal at all. This will be true notwithstanding that at the instant in question a strong illumination may be arriving against the color segment at the corresponding point, corersponding to a bright spot on the object under focus and emitting the light. The following further analysis must therefore be made:

At a very short interval after such condition the rotor will have progressed to bring into the line of sight the next color segment, and also the scanning beam will have progressed to the point of scanning an adjacent line or row corresponding to such new color segmental registry. This being the case all points along such new line of scan will be illuminated by light received through this new color segment, and subject to an analysis similar to that just above given, except that the strengths of illumination at all points along this adjacent line or row of scan will be governed by the extent to which this new color wave length transmitted by this new color segment will occur. If this new segment more nearly corresponds to the color of light arriving against such segment from the same point of the object which is focused, or a very close point of such object it is evident that a stronger illumination will be produced on a point of this new line or row of scan which is very close to that point previously considered than the strength of the previously existing illumination at the point previously considered, and which previous point was very close to the point now being scanned. Accordingly, a stronger signal will be sent out, although from a point very slightly displaced from the point which sent out the previously considered signal. By making the lines or rows of scan sufficiently narrow, satisfactory detail will be produced, and satisfactory color exactness will also be ensured for practical operations consistent with ability of the human eye to discriminate at normal viewing distances from the viewing screen of the receiver.

Of course the signals received by the receiver will be in black and white with the arrangements so far described, but due to the conditions exposed by the foregoing analysis it is evident that the strengths of illumination seen on the viewing screen of the receiver under normal viewing conditions and at points sufficiently close together will be such as to ensure good black and white reception on a conventional kinescope, even when the signals are sent out based on color scanning, and which signals are susceptible of use for producing a color replica, as will presently appear, by use of the improvements to which this application relates.

In Figure 4 I have shown the translating order of the electron beam of the receiving kinescope for signals received according to the sending scheme shown in Figure 2. In Figure 4 the several narrow bands traced on the fluorescent screen are defined by the spaces between the successive horizontal lines, and the order of translation of the beam is shown by the numerals along the left-hand edge of the diagram. It is noted that in this figure the replica will be correctly shown, for which purpose the starting point is shown at 83. The translations are effected successively for every third band, leaving two unscanned spaces to be filled in by later translations. These fill-ins are effected by interlaces. The line 84 shows the transfer from the end of band 11 to the beginning of band 12, the line 85 shows the transfer from the end of band 22 to the beginning of band 23, and the line 86 shows the transfer from the end of band 33 to the starting point for commencement of another complete set of translating movements. By the use of the two sets of interlaces the field is completely covered. If the kinescope beam is of dimension substantially equal to the dimension of the narrow bands thus traced on the viewing screen a complete area coverage will be effected; but even when the beam is somewhat narrower than the bands there will be such a degree of coverage that the eye will not readily discover such incompleteness, especially when viewing the screen from normal viewing distances.

In the absence of special provision the replica produced by the means thus far described will be a black and white replica. I shall now show how my present improvements may be incorporated into connection with the viewing screen to ensure production of a true color replica under the signalling conditions above explained:

I provide means to produce color lineations or color responses along the narrow bands of the viewing screen, or in such close proximity thereto that correct color interpretations will be produced without serious errors of either color or location due to refraction. These lineations constitute a portion of or are secured to or are incorporated into the viewing window of the kinescope, at which window the replica is produced. These color lineations are of a nature such that the three primary colors are or can be produced along their lengths when the kinescope is in receiving operation, so that the three primary colors thus made available are in linear registry with the proper translating movements of the electron beam of the kinescope, so that the spot of illumination produced on the fluorescent screen of the kinescope will show to the observer as of the proper color at each point over the surface of the screen where such spot appears during the operation of producing the replica. Furthermore, these lineations constitute a portion of or are definitely non-movable (during replica production) with respect to the body of the viewing screen, and they do not move with or constitute portions of the translating beam itself. Thus these color lineations comprise a portion of the stationary body of the kinescope, or are stationarily attached to the kinescope, as distinguished from constituting a portion or portions of the electron beam projecting means or electron beam controlling means. Under my presently disclosed improvements it is only necessary to use one beam, which is the conventional electron translating beam of the kinescope of conventional construction, as far as the electron beam and its control are concerned. Under my present improvements the color discrimination or interpretation occurs as a matter of place registry or location of the illuminated spot on the surface of the viewing screen, so that correct color selection to produce correct color replicas on the viewing screen depends directly on registry of the location of the spot of illumination with the correct location on the screen at each differential of interpretation, in order that correct color interpretation shall occur. This latter condition imposes the requirement that correct registry and color synchronizing of the lineations shall be ensured transversely of the lineations, so that at each instant of interpretation that lineation, or one of the lineations, of correct primary color shall be acted upon by the interpreting beam, or by the spot of illumination at the instant in question, and at each instant.

Under the broad definition of my inventive concept as stated above it also includes lineations for the primary color discriminations, whether such lineations be parallel to the directions of movement of the interpreting electron beam, or at an angle to such interpreting direction of movement, such angle preferably, but not necessarily being a right angle. It will be seen that this broad interpretation of my definition is a proper one since it nevertheless includes the requirement that the interpreting lineations shall constitute a portion of or be in stationary relation to the viewing screen itself, that the primary colors shall be made visible by illumination of spots of said screen, and that the arrangement shall be such that during progress of the translating beam over the surface of the screen these primary colors shall become successively operative, and also that at each point of impingement of the translating beam with the screen that one of the primary colors shall be made visible which correctly corresponds to the color to be shown at such point and at such instant during the progress of the replica production. I shall hereinafter disclose both types of embodiment of my improvements, namely, the "parallel" line type, and the "intersecting" line type.

In Figure 4 I have shown the color screen as being of the "parallel" line type, since the color scannings produced in the sending station shown in Figures 1 and 2 are of that form in which each full line is scanned laterally over its entire length while under a given color of illumination. Therefore, in Figure 4 the screen is shown as provided with narrow bands extending completely across the width of the replica to be produced, said bands being of substantially equal width and extending straight across the width of the interpretation to be effected, it being assumed that the lateral movements of the electron beam are also straight. The intention is that each of these narrow bands shall of course be traced along its length as the electron beam traverses the width of the screen, so that the beam shall continue to be in registry with such narrow band during such traverse. If the traverse of the beam were purposely non-linear, such as a slight curve, then the narrow bands should be of a like form, so as to ensure continued registry of the spot of illumination produced by the electron beam, with such narrow band during the entire traverse, so that at each point along the length of such band there will be produced, by the spot of illumination, a colored spot, visible to the observer, always in registry with the instantaneous location of the illuminated spot along the length of the lineation.

In Figure 4 the red lines or bands are designated by the numerals 87, the green lines or bands by the numerals 88, and the blue-violet lines or bands by the numerals 89. These three colors are repeated in regular order over the area needed to accommodate the replica to be produced; and in Figure 4 these lines or bands are indicated by the letters "R," "G," and "B," shown at the right-hand ends of the respective lines. These color lines or lineations are interposed between the spot of illumination produced by the interpreting beam and the observer, so that at each instant such spot is seen as of the color dictated by the lineation at such location on the face of the screen. According to present universal practice the spot of light is produced by impingement of the electron beam of the kinescope against the fluorescent surface on the inside face of the viewing window of the kinescope. When I provide a color screen formed of transparent lines or narrow bands of the proper colors, such color bands are located between the fluorescent screen or surface of the kinescope, and the observer. In this case the illuminated spot is produced, preferably in white light, as is now conventional practice, so that such spot when seen through any one of the primary colored bands will be of the color of such band. In case of use of a fluorescent screen formed of phosphor which produces some light which is not a pure white light I contemplate the use of colored bands or lines of colors or shades which will correct for such non-whiteness of the fluoresced spot, so that the colors seen by the observer will be thereby corrected, and produce a true replica of the scanned image of the sending inconoscope.

Other forms of lineated screens are hereinafter disclosed in full detail, as well as certain means or methods to produce the same.

Since the correct color showing on the viewing screen depends upon correct registry of the illuminated spot produced by the electron beam of the kinescope, at all points over the surface area accommodating the replica, it is necessary that provision be made to ensure such correctness of registry, and to enable corrections to be made by the observer from time to time as needed during a program of reception. Preferably the lineated screen is secured permanently to, or constitutes a portion of the viewing window or screen of the kinescope, although this is not always necessary. However, when such permanence of location of the lineated screen with respect to the viewing window exists it is evident that the needed "color synchronization" between the electron beam spot of illumination and the color screen must be effected by a suitable control of the beam itself, so that its zone of translation or other movement shall be brought into coincidence with the lineations to produce correct color registry all times. Such control may have to be made by a bodily shift of the area which is covered by the beam during its lateral movements, as well as vertically. In other words, lateral shifts of the beam's area of coverage may be required to properly "frame" the replica on the viewing window, as is now customary, and vertical shifts of the area of coverage may and probably will be necessary from time to time to ensure that during each lateral translation of the spot of illumination produced by the beam such spot will travel along one of the lineations with which it is intended then to register. Such vertical synchronization will also be necessary to ensure that, even with the beam travelling along a line and in register therewith, such line shall be of the correct color corresponding to the traverse then being executed by the beam.

Conventional receiving sets now in use are provided with adjustments for both vertical and horizontal beam controls, and for control of focus of the beam on the screen and in some cases such presently available controls will be found sufficient to produce the needed color synchronizations to which reference has been made above. However, in Figure 3 I have shown, schematically, a supplemental vertical control element 90 in the form of a coil unit which may be placed around the shank of the kinescope, and is of form suitable to produce bodily shift of the area of translation movement of the electron beam, so that each traverse of such beam will be bodily raised or lowered by use of such control according to well understood principles now in use. The control terminals of this unit are shown at 91 and 92 and may be carried to a suitable control button or other unit as desired, convenient to the operator of the receiver. If desired another supplemental control may be provided for enabling lateral adjustment of the area of translation, but such is not illustrated in Figure 3 since, with the translation arrangement therein shown, parallel to the lineations, it is not essential that the spot of light be in register with any exact point along the length of such lineation as it may then be in illuminating registry with, since, with this arrangement, the color is uniform along the length of such lineation.

Now the condition of color synchronism or non-synchronism may sometimes be determined merely by inspection of the replica being produced, since certain objects shown on the replica will be of a definitely known and recognized color, and even of a well known shade of such color. However, this is an uncertain method of color determination so I have herein provided means to show the operator definitely, and conveniently the condition of synchronism or non-synchronism of color interpretation being effected at all times, so that he can make such corrections as he may deem necessary from time to time. This indicating means includes means to produce on suitable portions of the replica or area observed by the observer, patches of apparently solid color, which patches will be of color depending on the condition of synchronism or non-synchronism existing at the time of such observation. Thus, three such patches may be provided for, one in each of two adjacent corners of the viewing screen, that is, the two ends of one side of the viewing screen, and the other patch being located at the midportion of the opposite edge of the viewing screen. These patches may be of suitable configuration, as round, square, rectangular, oval, or other selected form, and they may be of size and shape such as not to be too obtrusive on the attention of the persons observing the replica being translated on the screen. These patches will be of size in any case, however, such that numerous of the lineations of the color screen will intersect such patches so that the colors shown on said patches will depend on which lineations are being spot illuminated by the registry of the beam with such lineations while said beam is giving a strong signal. These patches are designated on Figure 3 as 93, 94, and 95, for the red, the green, and the blue-violet, respectively. Corresponding to these three patches on the receiver viewing screen or in connection with the lineated screen thereof, are the three areas on or in connection with the Zworykin plate of the iconoscope, or otherwise, to produce signals for the intended color registrations at the corresponding locations of the Zworykin plate when such plate is being scanned by the beam of the iconoscope. In Figure 1 there are shown the three patches 96, 97, and 98 which, when scanned by the electron beam (or otherwise), serve to cause the sender to emit signals, when these patches are being scanned for the colors corresponding to the patch colors designated on the patches 93, 94, and 95 of Figure 4. I shall hereinafter describe means whereby these iconoscope patches will cause such signals to be emitted for reception by the receiver in manner for production of the colored patches on the viewing screen.

It is here noted that for example when the scanning beam of the sender iconoscope is scanning a red line across the area or patch 96 of the sender (for red) signals will be emitted only under red illumination at said patch. When such signals arrive at the receiver, the electron beam of the receiver kinescope must be executing a traverse along a red lineation of the area of the patch 93 of the viewing screen in order to have the condition of color synchronism. Accordingly when color synchronism exists the spot of illumination of the kinescope screen must be executing traverses over the area 93, and on a red line of such area, being a line every third line of such area. Otherwise stated, when color synchronism exists every third line traverse of the receiver kinescope beam must be in registry with a red lineation extending across such area 93, then the red line illuminations will appear and the area will appear to be a red patch. Color synchronism will thus be indicated. On the contrary, if when such signal from a red line scan of the patch 96 of the sender arrives the electron beam of the kinescope is in linear registry with a lineation of some color other than red, as for example, a green, then the patch 93 will appear as a green patch, and the operator will at once know that a color correction should be made. A similar explanation will be applicable with respect to the other patches for color synchronization being the patches 97 (for the sender) and 94 (for the receiver), and repetition of description is not necessary. However, the provision of the three patches, for the three colors, and located at considerable spacings from each other makes it possible to secure good color synchronization for all these colors, by a balancing of color impressions received by the eye from all three of the patches of the receiver screen. Also, in case of non-ability to bring all three color patches to their proper colors at the same time the operator will know that there is some trouble in the equipment requiring correction. For instance, this condition might occur in case the electron gun was out of adjustment so that the beam's traverses were occurring across the window on lines non-parallel to the viewing screen lineations instead of parallel to or on said lineation as intended. Such a tilted condition would make it possible to bring the correct color into synchronization at one patch of the viewing screen, but the other patches would be out of synchronism, and would not show their proper colors.

To effect the foregoing color synchronizing test it will be understood that only the red signals shall be emitted when scanning the area 96 of the plate 51 of the sending station (see Fig. 1), only the green signals shall be emitted when scanning the area 97 of said plate, and only the blue signals shall be emitted when scanning the area 98 of said plate. Accordingly it will be understood that only the lineations for red are carried across the area 96, only the lineations for green are carried across the area 97, and only the lineations for blue are carried across the area 98. Thus no signals are emitted for scanning the area 96 unless said scans be effected on the "red" lines there present, and to effect "red" signals; and no signals are emitted for scanning the area 97 unless said scans be effected on the "green" lines there present; and no signals are emitted for scanning the area 98 unless said scans be effected on the "blue" lines there present. Accordingly, whenever the kinescope beam is executing a scan over its "red" area 93 it is known that any signals then contained in said beam must be due to a "red" scan at the sender, whenever the kinescope beam is executing a scan over its "green" area 94 it is known that any signals then contained in said beam must be due to a "green" signal at the sender, and whenever the kinescope beam is executing a scan over its "blue" area 95 it is known that any signals then contained in said beam must be due to a "blue" signal at the sender.

This color synchronizing will be referred to hereinafter. At this point I mention that this color synchronizing as herein disclosed has to do with means to enable the operator (if manual adjustment of the kinescope beam is used) to bring the entire field of the kinescope beam scans either up or down slightly so as to ensure that red lineations are being scanned for "red" signals, that green lineations are being scanned for "green" signals, and that blue lineations are being scanned for "blue" signals. This function of denoting to the observer the condition of such "field" color synchronism or lack thereof, is to be clearly distinguished from a means to automatically and constantly control the kinescope beam during scan of a lineation of given color so as to offset slight "waver" of said beam during such scan, as provided in Letters Patent No. 2,415,059 to Zworykin, or No. 2,530,431 to Huffman.

The foregoing description of Figures 1, 2, 3 and 4 includes statements referring somewhat specifically to what may be called "line" scanning for colors, wherein the scanning is effected parallel to the lineations. Also, said description has to do specifically with an arrangement wherein such "line" color scanning is effected over a complete field of lines for each color at a time, first scanning a complete field with the red, then a complete field with the green, and finally a complete field with the blue-violet. Thereafter repeating according to this scheme of scanning. This field system of scanning each color is desirable when the individual colors so scanned for are delivered to the Zworykin plate by a rotating segmental element such as the element 63 of Figure 1. If that disk were to be rotated fast enough to enable change of color segment as each new line was scanned such speed would generally be greatly excessive, so the field scanning arrangement has been illustrated. However, I shall presently describe an arrangement in which the "line" scanning can be executed with unchanged color during the scan of each line, but with change of color line by line, instead of field by field as described for Figures 1, 2, 3 and 4.

Reference has previously been made to ability to use kinescopes provided with my present improvements, that is, with the color lineations, for reception either of plain black and white signals for production of a plain black and white replica from such signals, or for color reception, from a sending station provided with suitable means to emit color controlled signals. Generally the lineations of my improvements will occupy the entire area of the screen to be used for replica production, the successive lineations being of a width to just come together, but generally without overlap. Under such full width lineation condition it is evident that all movements and positions of the spot of illumination produced by the electron beam of the kinescope will be behind points of such color lineations or at points where such color lineations exist. Under these conditions it will not be possible to view the spot of illumination at any point without also seeing the point as of a color dictated by the lineation color there in registry. However, in case of desire to be able to secure such black and white reception (as from a station not yet equipped to emit color signals) the following modification of my lineation improvements may be used:

By making my color lineations of less than full width, as for example, one-half the width between center lines of successive traverses of the kinescope beam, leaving the other half-spaces uncolored or non-responsive to colors, and by then so synchronizing the traversing movements of the electron beam that said movements are executed along these inter-spaces or non-colored spaces, it is evident that black and white reception may be produced, either from a station not yet equipped for color signalling, or from stations emitting signals under color control, but when, for some special reason, it may be desired to produce reception on the plain black and white basis. It is to be noted, however, that as time passes more and more stations will be equipped for color signalling, and that in any given locality the opening of a color sending station will probably result in desire on the part of owners of receiving sets to be able to receive such color emitted signals in color replica form, regardless of ability to continue reception in plain black and white. It will be seen from various of my improvements as already explained and described that such color reception may be had on already in use conventional receivers, provided merely that my improvements, primarily comprising the lineated screen of the kinescope, be incorporated into such presently existing conventional receivers, and provided that the emitted color signals be produced by linear scanning. It will also be seen that with the so far described arrangements it is possible to receive such color signals in such present conventional forms of receivers, provided with my lineated color arrangement, and under the condition that the emitted signals be produced under color scan without change of color during each scanning traverse of the scanning beam of the iconoscope or iconoscopes. I shall now show how receiver kinescopes embodying my improvements in the form of the color lineations may also be used, without further change of the conventional receivers, for color reception from sending stations sending color signals according to the so-called "dot" system of the R. C. A.

When operating according to this dot system, provision is made in the sending equipment for production of three light beams, one for each primary color, together with means to scan according to each of these three beams in succession, so that short signals are produced in regular sequence and succession, for these three colors of scan. Means are provided for "adding" and delivering to the radio antenna system signals as successive signals representing successive samples of the three color intensities successively tested. This sampling and adding, and signalling process is repeated continuously during scan of each line or row of the image being examined, so that "dots" are emitted of successive location positions according to the scanning process, and of strengths according to the intensities of color illuminations thus successively examined. These dot signals are received by the receiver in regular order as sent out.

Of course with this arrangement and this system of operation the receiver receives only a regular succession of short signals, representing the emitted dots, each dot being of that intensity which represents the intensity of light of the color being examined at the instant such dot signal was produced by the transmitter or sender. The receiver is provided with means to discriminate as between the dots representing the successive colors examined, and a three kinescope arrangement is provided in the receiver for receiving the successive dots on the successive kinescopes, and for producing beams from all of said kinescopes, which beams are brought to focus on a common viewing screen. On this screen there are produced a series of successive dots along each line or row corresponding in color to the three colors examined in the sender, such dots eminating from such three kinescopes in succession, and each dot being of a light intensity proportionate to the signal strength of the dot signal sent out by the sender. The successive lines scanned across the image screen of the sender are scanned in a peculiar succession and by a special scheme of scanning, to produce a complete field of scan by these dots; and the receiver must also interpret the dot signals which it receives in such manner as to produce on the viewing screen a true replica of the image thus analyzed by the sender. Therefore the receiver must be so arranged that it can lay down on the viewing screen a series of colored "dot" spottings corresponding in location and intensity to the indivdiual spots so analyzed and signalled by the sender. I shall now refer to Figures 36, 37, and 38 to show a analysis of this "dot" system of signalling, and to show how I am able to receive these dot signals by use of a single kinescope of conventional form and construction, and substantially without change from conventional black and white kinescopes as now being used, except that I incorporate into such receiver kinescope a lineated color screen of the type previously referred to herein, and with the lineations of such screen extending across the direction of traverse of the electron beam of such kinescope during its interpreting operations.

In each of Figures 37 and 38 I have shown a portion of the area to be scanned or analyzed according to this dot system, and in each of these figures I have shown portions of six horizontal lines or rows of scan, same being numbered at their left-hand edges as 1′, 2′, 3′, 4′, 5′, and 6′, respectively. Scanning is assumed to be from left to right, and horizontally along each row in succession as presently explained. The showing of Figures 37 and 38 is assumed to represent a portion of the image at the sending end, so that the order and placement of the dots which are successively signalled can be better understood for further consideration to show how said signals can be received and correctly interpreted in color by my improvements.

The image is scanned by "fields." The first field comprises dots along rows of odd number, so that rows 1′, 3′ and 5′ are first scanned. This scanning is conducted by use of the three primary colors in regular succession, as shown by the initials "R," "G," and "B" located in the various dots. Not only are the odd numbered rows scanned in succession, but also this is done in such manner that each time a new row is scanned the color pattern is shifted endwise or laterally one and one-half dots. Examination of Figure 37 shows this very clearly. Having completed scan of the odd numbered rows comprising the first field, the scanning beam or beams return to the top portion of the frame and then scanning of the even numbered rows proceeds. Thus, the even numbered rows are scanned as 2′, 4′, 6′, etc. Also, when transferring up from the last one of the odd numbered rows to commence scanning of the even numbered rows for the second field the color pattern is shifted one and one-half dots laterally, as will be evident from comparison of rows 5' and 2' in Figure 37, and at completion of scan of each even numbered row of the second field the color pattern is shifted laterally one and one-half dots as evident from Figure 37.

Two more fields are scanned to complete the entire pattern, as follows, reference being had especially to Figure 38:

Having completed the even numbered row scans by the scanning of row 6' (see Figure 37), scanning of the third field commences. This field comprises the odd numbered rows of the pattern, and it is noted that in transferring up from the bottom row of the second field (row 6', Figure 37 to row 1' of Figure 38) no lateral shift has been shown, so that row 1' is now a second time scanned, but at positions of dots displaced laterally one and one-half dots from the positions at which the dots of field number 1 were scanned. To produce field number 3 the odd numbered rows, 1', 3', 5', etc., are scanned, with lateral shift of one and one-half dots when transferring to each new row. Thus there are interspaced scan dots by the third field between the scan dots of the first field. Thereafter, the fourth field is scanned, comprising the even numbered rows for a second scan, but with the dots of this fourth field also interspaced between the dots scanned by the second field. Thus there are interspaced scan dots between the scan dots of the second field. Thus, by these four fields of scan the entire frame under consideration has been covered by dots located in successive parallel rows extending across the image. Of course as these dots are successively scanned corresponding signals are sent out and may be picked up by a receiver of conventional form, provided with a single kinescope; and the electron beam of such receiver kinescope may be tuned to follow these dot signals, by lateral traverses of such beam of the receiver exactly corresponding, both as to vertical position, and as to lateral dot positions, to the points scanned and signalled by the sending station; and furthermore such single kinescope beam will respond in strength to the strengths of the signals thus being emitted for the individual dots so examined. Therefore, by tuning a conventional single kinescope receiver to receive such signalled dots, and to cause lateral and vertical electron beam movements corresponding to such beam movements emitted by the sending station, such single kinescope electron beam of the receiver will produce and spot on the viewing screen dots in horizontal rows, and in spacings exactly corresponding to the dot spacings scanned, and each such dot will be of an intensity corresponding to the strength of illumination of the corresponding point on the image scanned in the sender, under the color at which such image was illuminated at the instant of examination of such point. It therefore remains only to show how, by use of my lineated color viewing screen improvement, I am now able to cause these dots to appear to the observer in the correct color replicas, so that a correct color replica of the entire image so scanned will be produced to the view of the observer.

In Figure 36 I have shown schematically a lineation of color lines extending vertically, and properly related to the four fields of dot scan produced on the viewing screen of the single receiver kinescope according to the operation just above discussed. In Figure 36 the lineations are successively for the three primary colors, and the lateral spacings of these lineations correspond to the requirements imposed by the spacings of the dots laid down on the viewing screen by the kinescope beam under the requirements of the received signals. It will be seen that each lineation is of a width one-half that of the dot to be treated, so that there are provided twice as many lineations as there are dots along any given row. However, when it is remembered that on the third and fourth fields the dots are interspaced between the dots previously laid down in the rows of such fields it will be seen that when the operation has been completed all incremental portions of the entire area have been spotted by dots, and that all of said dots have been spotted on lineations of color correct according to the colorations of the minute areas of the image analyzed for production of these dots. In order to ensure correct color synchronization under this scheme of interpretation it is only necessary to shift either the lineation screen or the range of movement of the translating beam laterally of the viewing screen to bring each lineation into alignment with dots of its color as shown by Figures 36, 37 and 38. Such lateral beam shift may be produced in any convenient manner as by means of a supplemental beam control for bodily horizontal beam shift as indicated schematically in Figure 25 which will be presently described in detail.

It is thus evident that my lineation improvement for enabling production of color reception and interpretation for production of a correct color replica of the image analyzed may be used with either the "rotating disk" or the "full line color scan" type of operation, or the "dot" type of operation, and that substantially the only difference needed in the receiver of the system is that the lineated screen of my improvements shall be horizontal lined (lines parallel to the linear traverses of the kinescope beam) in the first case, and vertical lined (lines intersecting the linear traverses of the kinescope beam) in the second case. In the first case the spacing between center lines of my lineations must be according to the spacing between successive traverses of the kinescope beam; in the second case the spacing between center lines of my lineations must be according to half the distance between dots laid down on the viewing screen during each lateral traverse of the kinescope beam.

Although standards have not as yet been prescribed by the F. C. C. governing the number of dots which may be scanned across the image to carry out the "dot" system just above considered it is understood that said system has been operated on the basis of 241 dots to be laid down on each scan across the image. Accordingly, to receive and correctly translate signals received according to this dot system, in correct color replica, there should be 482 lineations across the lineated screen, that is, across the viewing screen; and on the basis of a width of 20–24 inches for such viewing screen this would produce a lineation of substantially 19–24 lineations per inch, the lineations being vertical. When it is remembered that any system which interprets in color possesses the advantage over the black and white system that the human eye tends to blend the received impression much more readily than with black and white reception, and when it is remembered that almost all colors which will be translated are complex colors, and not the pure colors of the three primary colors of the lineations, it is seen that most of the detailed analysis of the image on the sender plate will result in sending signals for two colors at successive scans for many of the minute elements color analyzed, since signals will be emitted during exposure to both of these successive colors, but of different strengths. These "duplicated" signals will of course produce on the receiver corresponding duplicate signals, so that duplicate color dots will be spotted very close together on the viewing screen representing the replica of such element so analyzed by the sender, and a blending of colors will result. Such blending will not only produce the correct color on the replica but will also largely wipe out inaccuracies of impressions produced on the eye of the observer so that a very accurate and clear replica of the original image will be produced.

As above explained this R. C. A. "dot" system of signal transmission and interpretation at the receiving end is such that dots of the same color range (red, or green, or blue-violet) are laid down on the viewing screen in vertical alignment so that I am able to produce the correct color responses from such dots by straight vertical lineations as alreday shown. If, however, the samples of color signals should be taken at the sending end of the system in such order, or at such locations relatively to each other that such alignments could not be used in the lineations at the receiver, small areas or dots of proper color could be provided on or in connection with the viewing screen which would be properly spaced and related to each other so that each dot of light produced by the single electron beam of the receiver kinescope would be seen or would produce on the viewing screen as a correct color dot, of the strength dictated by the strength of the signal received for such dot. Thus a correct replica would be produced on the viewing screen, both as to form and color of the image analyzed by the sending equipment. I shall hereinafter show how such an irregular or non-linear "lineated" form of color screen may be readily produced in or for the kinescope viewing screen.

Various forms of lineated color screen may be used within the purview of my present invention, some of which are illustrated herein. These I shall now describe.

First I shall describe certain lineated screen embodiments in which use is made of a fluorescent surface of conventional form against which the electron beam is directed to produce, by fluorescence, the usual spot of white light; and in combination with such conventional form of fluorescing surface I then provide my lineated color screen as a transparent screen placed between such fluorescing surface and the observer so that the spot of illumination must be viewed through that one of the primary colors with which the spot is momentarily in register or alignment. Such lineated color screen may be located on or in connection with the viewing area of the kinescope window, and either inside of such window (inside of the kinescope envelope), or outside thereof; but generally the lineated screen should be within the kinescope and close to the fluorescing surface so as to ensure correct register of each lineation with the illuminated spot regardless of angularity at which the viewing screen is viewed by the observer, and also to avoid error of lineation color effect due to refractive effect of the transparent window and aberration.

In Figures 16 and 17 I have shown a simple lineation arrangement in which the front end portion of a conventional kinescope envelope is shown at 99. This envelope is provided with the conventional transparent window 100, generally of glass, and the conventional fluorescent surface 101 is provided on the inside face of this window. This surface 101 is formed of suitable phosphor which will produce white light under the excitation of the electron beam 102 according to conventional practice. The window 100 is formed on a curved or rounded surface which may bear a definite relation to the center of swing of the beam 102, also according to conventional practice, which formation of the window surface is desirable for various reasons. With the arrangement so far described the replica will be formed on this viewing screen in simple black and white representation. In the arrangement of Figures 16 and 17 I then provide my lineated color screen against the outside surface of the window, being the thin screen 103 formed of transparent material of formation to closely seat against the surface of the window at all points, and retained in position against the window by suitable means, such as applications of thin cementing agent applied at the corners of the screen, or along its edges, or other locations which will not interfere with the transparency of the area in line with the replica. Preferably the lineations are formed on the inside surface of this applied screen 103, so as to bring said lineations as close to the fluorescing surface 101 as possible, with only the thickness of the window 100 between the fluorescent surface and the lineated surface.

In the form shown in Figures 16 and 17 the lineations are horizontally placed, conforming to the horizontal traverses of the beam 102, and spaced according to the vertical spacings between said traverses. These lineations are designated as 104, 105, and 106 in Figure 16, for the red, the green, and the blue-violet, respectively, and these colors (or other primary colors which may be selected for the purpose), are repeated regularly over the full hight of the viewing screen on which the replica is produced. These colors are indicated by the initials "R," "G," and "B-V" on the lineations in Figure 16.

In the corners at the left-hand side of the screen, as viewed in Figure 16 there are indicated the areas 107 and 108, designated "Red syn.," and "Blue-Violet syn.," respectively, and in the central portion of the opposite edge of the screen there is indicated the area 109, designated "G. syn." These areas are the locations in which the respective primary colors should appear as patches of color when the lineated screen and the traverses of the electron beam are in registry during the translation of the incoming signals. When these patches appear in correct colors as designated, the observer will be informed that the colors shown are correct and true.

Now the traverses of the electron beam are substantially horizontal lineations across the viewing screen, each such lineation of beam contact with the flourescing surface lying within a plane which may be drawn through the center of rock on which the beam rocks during its vertical changes. The actual surface distance between two such lineations measured at successive locations along the width of the screen might vary at such successive locations, but in any case it is intended that my color lineations shall be so formed and located, and shall be of such configurations, that said color lineations conform to the path of travel of the illuminated spot across the viewing screen at all locations, for beam traverses at all vertical locations during replica formation.

Such a lineated color screen as that shown in Figures 16 and 17 might be formed by use of a suitable transparent material of flat form on which the color lineations could be placed by use of suitable inks or dyes of proper colors; and after ruling or otherwise forming such color lineations on such flat surface the sheet of transparent material could be conformed to the surface formation needed to set evenly against the outside surface of the kinescope window at all locations. Such conformation could be effected, for example, by using a sheet of transparent plastic of composition such that such sheet could be conformed over a form of proper contour with application of a relatively low temperature of applied heat. Upon cooling, such conformed transparent color lineated sheet would retain its proper configuration, and could be applied to the window surface in such manner as to retain it in correct position thereon. If, during such heat conformation it was found necessary to protect the already produced color lineations, such protection could be effected by application of a very thin coating of transparent protective material by spraying operation, which material would, when dried prior to the heat configuration, serve to protect the color lineations, while not interfering with the transparency of the sheet and its color lineations.

During the ruling of the lineations on such a sheet said rulings would be parallel to each other (according to the use of simple ruling operations). Any departure of the lineations from equal surface spacing in the finished and curvature conformed screen, needed to ensure correct registry with the traverses of the illuminated spot, could be effected in any one of several ways. Either the rulings could originally be effected in such amount of non-parallelism as needed to ensure correct final formations of the lineations; or during the process of conforming the sheet by heat application, as already mentioned, tension could be applied along the upper and lower edges of the sheet at various amounts of tension at different locations, so as to produce slight stretch during the heat conformation, at different locations along the edges and along the lineations. Such stretch would serve to widen the spaces between successive color bands, or widen such bands, according to the requirements of the finally formed screen to ensure correct lineation registry with the beam traverses. Other methods of producing such transparent lineated screens will also suggest themselves to the student of this specification.

As a further method of producing such color lineated screen directly on the outside surface of the window of the kinescope the following operations may be used:

A suitable coating of polychromatic light sensitive material (emulsion) may be applied to the inside surface or to the outside surface of the window and allowed to dry in the customary manner and according to customary photographic processes. When this photographic responsive surface has been prepared a carefully prepared master screen or transparent templet, provided with carefully prepared and correctly located color transparent lineations, will be set into good surface contact with the photographic surface of the window. To ensure such good surface contact this master templet will of course be formed of surface configuration exactly conforming to the surface form of the window itself. Thereafter the photographic surface of the window will be exposed through this master templet, and then properly developed and otherwise photographically treated to bring out and fix, on the photographic surface of the kinescope window, the color lineations as reproduced from the master templet. By this means exact conformation of the color lineations will be produced on the surface of the kinescope window at low cost and by use of processes of well known and widely practised kind (color photography). Of course such photographically produced color lineation screen should be formed by use of light sensitive coating or emulsion which will have good transparency when developed and fixed and otherwise treated, so that the color lineated screen thus produced shall be transparent through said color lineations.

In Figure 17A I have shown another embodiment of my color lineated screen as directly applied to the transparent window of the receiver kinescope. In this case, however, such color lineated screen is applied to the inside surface of the window instead of its outside surface. In the present case the color lineated transparent screen is indicated by the thin layer 110, and the fluorescent surface which is caused to fluoresce by the electron beam 111 is shown at 112. In this case the color lineated screen is applied directly to the inside surface of the window, and the deposit of phosphor for the fluorescent screen is then applied to the inside surface of this color lineated screen. Preferably, also the color lineations should be on the inside surface of the color lineated screen and in direct contact or close to the fluorescent surface so as to secure best registry between the illuminated spot and the color lineations.

The color lineated screen arrangement shown in Figure 17A may be produced in convenient manner, as by the application of a properly surface conformed thin sheet of lineated material (color lineated) of transparent material, to the inside surface of the window, after which the deposit of phosphor may be made on such color lineated screen; or such color lineated screen may be first formed photographically on the inside surface of the window, according to the method already suggested herein, or other suitable photographic method to produce the color transparent lineations at correct spacings and locations, and preferably with the sensitized surface facing inwardly towards the electron gun; after which the deposit of phosphor may be made on such previously prepared color lineated screen. Of course in Figures 17 and 17A the thicknesses of the deposit of phosphor (fluorescent coating), and of photographic emulsion or surface, are shown greatly exaggerated as to thickness, for purposes of illustration, only.

In the arrangement shown in Figure 17A the window 113 is shown as comprising a separate unit or element from the body 114 of the kinescope envelope. Also, said body portion 114 is designated as "Metal or Glass." Under processes now widely in use for the manfuacture of these receiver kinescopes this type of construction (metal body and glass window) is used, and has been found highly acceptable. Suitable processes have been developed for sealing the window of such a construction to the metal body thereof. With this type of construction the color lineated screen could be formed on the inside surface of the window prior to sealing such window to the metal body, and with suitable provision for protecting the window and such color lineations from excessive heat around the edges being sealed. Then the deposit of phopshor could be made on the inside surface of the lineated screen after the window had been sealed to the metal body of the kinescope, according to presently accepted methods, and also a thin deposit of aluminium may be effected on the phosphor and other surfaces to improve brilliancy, also as well known in the art at this time.

At this point it may be mentioned that although the color lineations shown in the forms of Figures 16 and 17, and 17A are horizontal lineations, corresponding to one system of interpretation previously described, such lineations might have been shown and described as vertical, or at angles to the horizontal other than right-angles, according to the requirements of the signals being received. I contemplate as being within my improvements all such arrangements of the lineations as may be needed to meet the requirements of the signals being received, and to effect correct color interpretations and produce correct color replicas.

Also, the showings of Figures 16 and 17, and 17A are such as to include the color lineations on surfaces which are of non-planar form, to meet the special requirements or desirabilities of operation of the conventional forms of kinescopes currently in use. I also contemplate provision of my color lineations on other forms of surfaces, such as flat ones. I shall now refer to figures showing such other forms of window surfaces.

In Figures 18 and 19 I have shown the front portion of a receiver kinescope in which the window section 115 is of glass of other suitable transparent material, and is sealed to a body portion 116 in suitable manner, as by a fusing operation produced around the coincident edge portions of such window and body portions. Such coincident edge portions may be properly kerfed and then fused together as shown at 117. In this form of kinescope construction this window is formed with a flat inner surface, preferably projecting backwardly slightly from the plane of such fusing operation, as shown in Figure 19, so that the surrounding edge portion of the window section may seat back against a shoulder 118 provided around the front end of the body portion, or against a suitable gasket or buttress of such material as fiber 119 which is first set against such shoulder. By this means the area of pressure engagement of the window section against the front end of the body portion (such pressure engagement being caused by atmospheric pressure due to the evacuation of the kinescope envelope), may be greatly increased, thus distributing such pressure, and greatly strengthening the resulting completed kinescope. By use of such flat inside surface of the window it is possible to produce on such window the needed color lineations by ruling operations, using suitably colored dyes or suitable transparent inks during such ruling operations, the flat surface being available for such ruling operations since they are performed prior to sealing the window to the front portion of the body. Also, if needed a thin transparent coating of suitable material may be applied to the color lineated screen thus produced, prior to application of the phosphor deposit to the inside surface of such lineated screen. Such deposit of the phosphor will generally be effected after the window has been sealed to the body portion. In Figures 18 and 19 the thicknesses of the color lineated screen and of the phosphor deposit, and the widths of the lineations are shown greatly exaggerated for purposes of better illustration.

The window section shown in Figure 19 is provided with a non-planar outer surface so that said window constitutes in effect a lens, so that the color replica seen by the observer through this window will be affected by the effect of such lens. Such non-planar form of such outer surface may be made such that a correct, but enlarged replica will be produced by such lens effect, ensuring correct proportioning of the replica both as to lateral as well as vertical dimensions over the full area reproduced by the replica. The general form of window shown in Figure 18 is rectangular according to presently accepted forms.

It is also noted that the lineations shown in these Figures 18 and 19 are vertical instead of horizontal. I contemplate horizontal lineations according to the color lineated screen disclosures of these figures, or lineations at other angles as needed according to the signals being interpreted. I have also, in Figure 18, shown the color areas 120, 121, and 122, designated "Red," "Green," and "Blue," respectively, at which the color synchronizing signals will appear, according to the principles already explained herein.

In each of the embodiments thus far described in detail (those of Figures 16 and 17, Figure 17A, and Figures 18 and 19), the color lineated screen is produced by application of the transparent color lineations between a fluorescent screen on which the illuminated spot appears, and the observer, such color lineated screen being formed in suitable manner. Such color lineations may also be produced otherwise than by use of such an interposed screen. For example, the fluorescent screen itself may be formed of narrow bands of different kinds of phosphors, such narrow bands corresponding to the lineations of color to be produced by exciting effect of the electron beam as it moves over the phosphorescent surface. By selecting phosphors which will emit wave lengths proper for production of the desired primary colors at the correct locations on the screen, the desired color interpretation effect will be produced. I shall now describe an embodiment of my present improvements wherein this form of color lineated screen is disclosed. For this purpose reference may be had to Figures 12, 13, 14, and 15.

In Figure 13 I have shown a transparent sheet 123 such as a glass sheet, having applied to its right-hand surface a series of narrow bands or lineations of material, 124, 125, and 126, such bands occurring in regular order and being formed of different materials, over the surface to be excited by the electron beam. These several bands are formed of deposits of phosphors which will emit different wave lengths of light when excited by the electron beam, so that different colors of light will be emitted by the different bands when they are thus excited. Thus certain of the bands will be of phosphor to emit a red, certain of the bands will be of phosphor to emit a green, and certain of the bands will be of phosphor to emit a blue-violet. The phosphors will be selected according to their characteristics to emit wave lengths of the desired values to produce the primary colors, or bands of colors including such primary colors at or near their peaks of wave length emittance. It is also here noted that since all of these lineations or bands will be subjected to the same exciting electron beam, they must all be responsive to substantially the same wave lengths of excitation. Phosphors suitable for production of such lineations as I herein contemplate are available, and much investigation has been done to determine characteristics of many phosphors, which material is publicly known and constitutes a portion of the public domain as to such materials. Examples of such phosphors will now be stated by way of illustration, and not as a matter of limitation of any of the features of my present invention, and to show how color lineated screens may be produced on this "different phosphor" principle, for use according to my present invention.

Rhodamine will emit wave lengths in the red range of great strength under excitation of wave lengths produced by the electron beam (see J. W. Marden and N. C. Beese, Trans. Illuminat. Eng. Soc., 1941, pp. 235–242). Zinc silicate will emit wave lengths in the green range of great strength by excitation of wave lengths produced by the electron beam, and magnesium tungstate will emit wave lengths in the blue range of great strength under excitation of wave lengths produced by the electron beam. (See A. B. Oday and R. F. Cissell, Trans. Illuminating Eng. Soc., 1939, p. 1165.) Also, the zinc silicate is excited by wave lengths in the range 220–2960 Angstrom Units, A. U., and will produce wave lengths in the emitted range of 4500–6200 A. U., and with a peak emission at substantially 5250 A. U. Also, the magnesium tungstate is excited by wave lengths in the range 2200–3200 A. U., and will produce wave lengths in the emitted range of 3800–7200 A. U., and with a peak emission at substantially 4300 A. U. Furthermore, the sensitivity peak of the zinc silicate is at 2537 A. U., and the sensitivity peak of the magnesium tungstate is at 2850 A. U. (The sensitivity peak of the rhodamine is also believed to be near the range of 2600 A. U.) Now the sensitivity peak mentioned above is that wave length of the excitation imposed by the exciting beam which will produce maximum emission of wave lengths from the material in question. Accordingly, it is seen that when any one of the three materials mentioned above is subjected to an exciting wave length of the order of 2600 A. U. it will emit wave lengths of good strength or intensity, and of the range stated above, and with an emitted peak as stated above. By use of these three materials for production of the narrow bands or lineations, or other suitable materials, it is possible to produce these lineations such that as each narrow band is excited by the traverse of the electron beam such band will emit a light color of primary color peak, or close to such peak, and such color will appear to the observer looking at the viewing screen thus produced. When using lineations formed by such different phosphors, or other selected but different phosphors, it is not necessary to provide the transparent color lineations previously described herein. This is true because these different phosphors will then be performing the two functions of producing the illuminated spot which is observed by the observer, and also determining the color of such spot at each point of observation where the spot appears. I do not intend to limit myself to the foregoing examples of different phosphors suitable to the present purposes, but cite them merely by way of example.

At this point I call attention to the following in reference to the use of lineations produced by different phosphors to produce the several color lineations under excitement:

The electron beam of the kinescope produces a range of wave lengths, which range may, however, be relatively narrow. Nevertheless such relatively small range will cause fluorescence from each such phosphor formed lineation which fluorescence will include also a narrow range of wave lengths. Furthermore, each such phosphor when excited will naturally emit a range of wave lengths, and the strengths of these wave lengths so emitted over such range will vary from a low value for small wave lengths, to a peak value for higher wave lengths, and will again fall to a low value for wave lengths still higher. I have previously mentioned the wave lengths for the emitted peaks in the cases of zinc silicate and magnesium tungstate. It is therefore evident that with the use of different kinds of phosphors to produce my color lineations there will be some overlapping of colors emitted by the excitation of the several lineations, but this will be desirable since thereby a large degree of correction will be effected in the production of the colors produced to the view of the observer, because in a great majority of cases the colors scanned by the sending equipment and signalled will not be pure colors but will be complex colors produced by simultaneous emission of wave lengths over a range of considerable extent. This corrective effect will be additional to the corrective effect to be produced in the effect on the observer by reason of the persistance of vision in passing from one small area to another of different color.

In Figure 15 I have shown the inner flat surface of the window section 127 of the kinescope as provided with the deposit layer 128 of phosphors according to the above described principle, to produce the phosphor lineations 124, 125, and 126 according to the arrangement shown in Figure 13. The electron beam 129 is shown exciting one of these phosphor bands or lineations. In Figure 12 I have shown schematically a face view of such a screen as that of Figures 13 and 15, and have designated thereon the successive lineations or narrow bands of the different phosphors referred to above, by way of illustration only. In this figure I have also designated at the right-hand edge of the figure the color lineations to be produced by excitation of these bands, such designations being by the initials "R," "G," and "B. V."

The signals received by the conventional receiver are based on the scanning program being executed by the sender, both as to lateral translating movements or traverses of the kinescope beam, and as to its vertical movements. According to presently conventional operations the scanning lateral movements in the sender are first produced on one field of alternate lines, and then a second field is scanned on the intermediate lines, as an "interlace." The electron beam of the receiver will also execute like traversing movements, and like vertical movements to translate correctly and at proper placements on the viewing screen the successive signal strengths received. Therefore the electron beam of the receiver will also translate the odd numbered lines or bands on one field of translations, and then will translate the even numbered lines or bands on the next or interlace field of translations. In order for my presently disclosed improvements to be directly applicable to conventional receivers, and to conventional kinescopes, except for the addition of the color lineations (and possibly a supplemental control on the stem of the kinescope for producing vertical bodily correction of the traverses of the beam in order to ensure color synchronization), it should appear that the signals currently being sent out, may also be received and properly translated by operations which involve single interlacing scans of the iconoscope beam, as well as double interlacing operations, such as already discussed herein. Ability for my improved color lineated kinescopes to receive and correctly interpret in color such single interlaced signals will show the further usability and value of my improvements to meet all conditions of color signalling. For this further analysis reference is had especially to Figure 12.

In Figure 12 the several lineations are traversed by the electron beam in the order of sequence shown by the numerals along the left-hand edge of this figure. Thus, the odd numbered lineations are traversed on the first field of operations, and such field terminates at the point 130 in said figure, being the end of the line or band 16. Transfer is then made upwardly by the beam to the point 131, and the even numbered bands are then traversed in regular order to the termination point 132. From this termination point return is made to the beginning end of line or band 1, and the operation is repeated, thus repeating continuously. Now examination of the sequence of these traverses shows that the order of lineation traversing is as follows: red, blue-violet, green, red, blue-violet, green, etc., on the first field, and green, red, blue-violet, green, red, blue-violet, etc., on the second field, so that all lines are traversed during the complete operation, and during each field of traverses the three colors are encountered in succession. When the signals are being sent out by the sending station on the basis of one interlace it is evident that the receiving station would receive its signals in correct order, both as to placement and as to color sequence, since the color sequence emitted by the sending station on the basis of a single interlace would be the same as the color sequence above shown for the receiver electron beams's traverses.

I may here mention that with a single interlacing operation in the sender, and with the use of a single iconoscope in the sending equipment, and with the use of a rotating three color segmental disk arrangement such as that shown in Figure 1 it is possible to emit the color signals in the order just above analyzed, and to ensure transmission of the signals in such order, so that correct color reception will be produced at the receiver when using my three color lineated screen improvements, and with the single interlace at the receiver. Such result may be secured, for example, by rotating the three color disk element or rotor 63 at such speed that successive lines or rows of the image on the Zworykin plate are scanned under successive color incidences, so that the lines or rows thus successively scanned will be of successive colors, according to the requirements of the operations just previously described herein, for single interlacings.

In Figure 14 the kinescope is shown as circular. Evidently, however, it might be square or rectangular, or of other form, and according to specifications of the F. C. C. as respects aspect ratios, etc.

Instead of using a three color rotor such as that shown at 63 in Figure 1 for production of single-line single-color scanning, with change of color with each new line scanned, use may be made of other arrangements. Thus, a suitably arranged detector plate of the Zworykin type may be used. Such a modified detector plate arrangement is shown in Figures 5, 6, 7, 8, 9, and 10. In these figures the arrangement is a conventional sending scheme similar to that of Figure 1, but with omission of the three segment three color rotor 63, and substitution of a modified form of detector plate. Accordingly, I shall not describe such schematic arrangement in detail, but shall describe the detector plate arrangement therein shown.

In this modified detector plate arrangement the detector plate 133 is of the Zworykin principle, including the sheet or layer of dielectric 134, the back face of which is provided with the sheet or layer of conductor 135 whose potential changes according to the Zworykin principle. The front face of this plate 134 of dielectric is provided with the minute particles of suitable photosensitive material, separated from each other, and sensitive to the intensity of light incident on them. These particles are shown by the layer 136 in schematic form. Directly in front of these particles there is provided a three color transparent layer 137 of very thin material, having the three colors lineated thereon according to the general principles already disclosed herein. This layer is formed with the three primary colors in succession, and in the form of narrow lines or bands, corresponding in width to the requirements of the unit. Under present F. C. C. specifications there would be 525 of these color lineations, and the scanning of the scanning beam would be on the basis of such requirement of 525 lines of scan, and with two fields of scan. Odd numbered lines would be scanned on the first field, and even numbered lines scanned on the second field, interlaced between such first scanned lines.

Figures 5, 6, 7, 8, 9, 10:
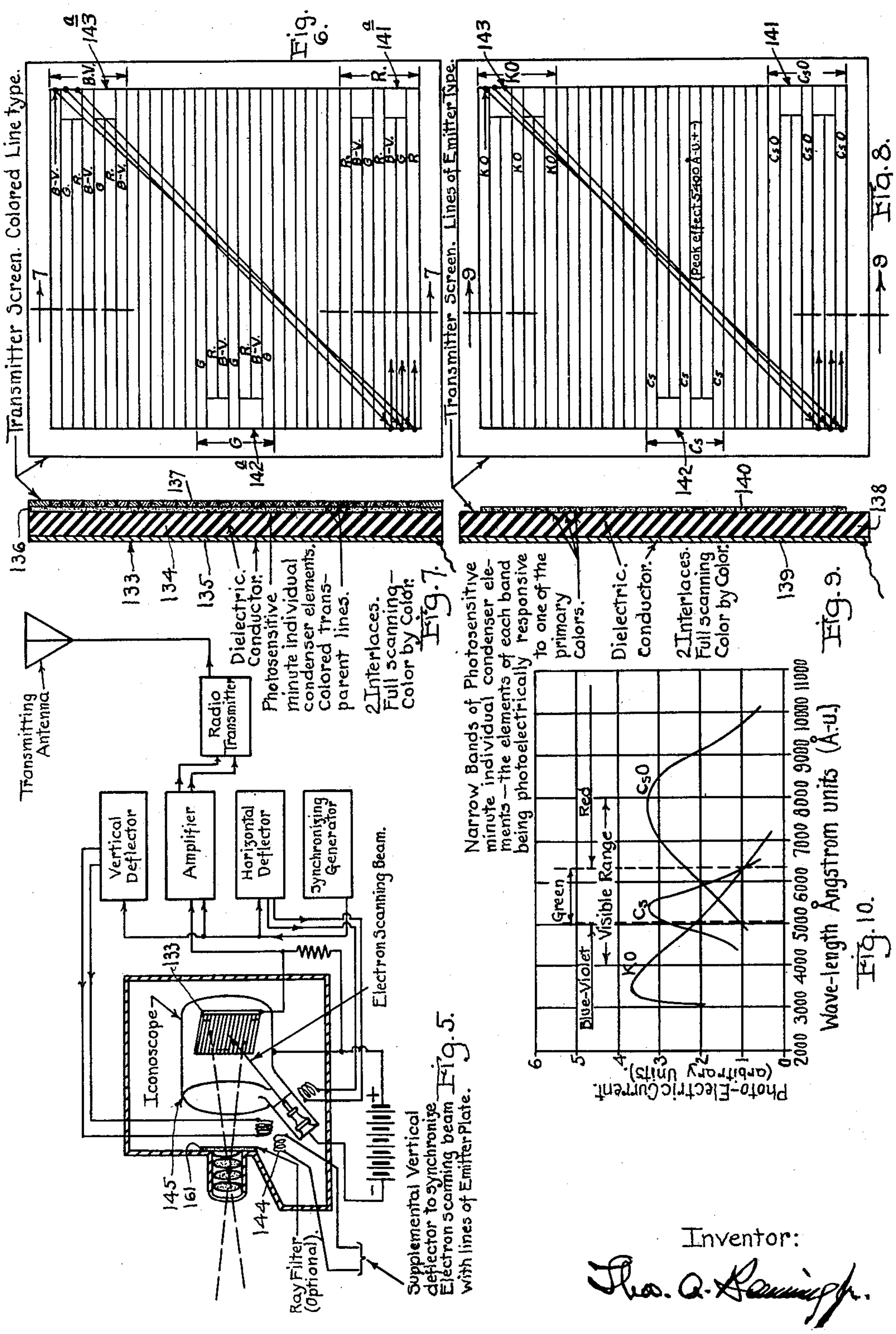

As each line of this arrangement was scanned the minute particles under the coloring of that line would come into play, so that the strength of signals emitted would be according to the color of the lineation then being scanned. The receiver, being tuned to the sender, would also be translating signals along a corresponding color of lineation, so that correct color reproduction would be produced. In Figures 6 and 7 the thicknesses of the several layers, and the widths of the color lineations are greatly exaggerated for purposes of simplicity in showing.

In Figures 8, 9, and 10 I have shown another modified form of the Zworykin detector plate which will also cause signals to be emitted according to the color lineations being scanned, and with signal strengths according to the intensities of light incident on such lineations at various points along their lengths. In this case I provide the detector plate with minute particles of photosensitive materials, according to the principle of the Zworykin plate, such plate also including the sheet of dielectric on which said particles are deposited individually, and said plate also including a sheet or layer of conductor on its back face from which sheet the signals are delivered. In Figure 9 the sheet of dielectric is shown at 138, the back sheet or layer of conductor at 139, and the photosensitive particles are shown by the layer 140. In the presently modified form of detector plate the photosensitive particles comprise particles of three (or two) materials, each of which kinds of materials is photosensitive to wave lengths over a relatively narrow band or range, and which different kinds of materials are thus photosensitive over a band different from the bands of the other materials, or at any rate which different materials have peaks of photosensitivity at wave lengths different from the other materials. These materials are selected such that each one of them is most photosensitive at or near to the wave length of one of the primary colors, and the photosensitivity of such material falls off from such peak at wave lengths both greater and less than such peak wave length.

The photosensitivity above referred to may also be considered as the magnitude of the photo-current which will correspond to emission of electrons from such material under the incidence of wave lengths to which such material is subjected. Many materials have been carefully analybed to determine their characteristics including such photo-electric sensitivity. In the public domain of information relating to this subject there are data covering many such materials. As examples of three such materials I may mention by way of example, only, and not as any limitation on the scope of my present invention, the following: $C_sO$, $C_s$, and KO. Typical curves of photosensitivity of these three materials are shown in Figure 10, wherein the photo-electric currents emitted by these three materials are shown in arbitrary units. It will be seen that for each of these materials such current rises with increase of wave length from a low point to a high or peak point, and then falls for even higher wave lengths. It will also be seen that these peak positions for the three materials occur roughly at wave lengths corresponding to the three primary colors in question. Also, that the peak values of such photo-electric currents correspond roughly to the same current values.

I propose to form the photosensitive deposit or layer of minute particles, 149, on the detector plate of Figures 8 and 9 of these three materials, and to do this in such manner that said deposit or layer comprises narrow bands or lineations corresponding in number of the scans needed to produce the color signal (525 according to the present rulings). These narrow bands or lineations each are composed of a selected kind of such materials, so that the photosensitivity of such narrow band or row is the same along its length, and thus may be considered as a color lineation in the sense that it will be greatly more photoresponsive or sensitive for wave lengths of the corresponding primary color than other colors; and each of these three kinds or groups of "color" lineations will be most photo-responsive to its particular primary color or colors of wave lengths close to such color.

In Figure 8 I have shown by the markings "K," "$C_s$," and "$C_sO$" such alternating bands of these materials, and it will be seen that they come in regular alternation from top to bottom (or from bottom to top) of the detector plate. Also, in this figure I have shown the return lines by which the electron beam may be returned to its high positions when two interlaces are employed. This figure also shows how, by carrying the lineations of these three materials into the synchronizing patches leaving the areas of said patches uncoated except at the locations of the continuations of said lineations, it is possible to emit the required "synchronizing" signals for producing the needed synchronizing patch signals on the viewing screen of the receiver. These patches are shown in Figure 8 at 141, 142, and 143 for the red, the green, and the blue-violet, respectively.

Examination of Figure 10 shows very clearly that each of the indicated materials has a span of wave length sensitivities sufficient to overlap its neighbors, so that in passing along the range of wave lengths two of these materials are influenced more or less for practically all wave lengths between about 4300 and 7000 A. U. Thus, for any wave length within such general range either or both of two materials may be emissive, but generally one or the other material will be predominantly emissive for such suggested wave length. However, if such wave length (color, mixed), happens to cover an area of the detector plate broad enough to embrace both of these materials, one of the materials will be scanned on one pass of the scanning beam, sending out signals of strength proportionate to the strength of illumination to which such material is being subjected, and depending upon what the wave length of such illumination happens to be, and on the adjacent or next pass of the scanning beam (over the adjacent lineation) substantially the same color will be effective on such later pass, so that another signal will now be sent out. This second signal will also be of strength proportionate to the strength of the illumination, but further affected by the fact that it is initiated by this other photosensitive material. Thus a second spot of illumination will be produced on the viewing screen of probably a different strength, and of another color, but the combined effects of the two signals and the corresponding two color effects produced on the viewing screen will be such as to produce on the observer a very accurate optical impression, both as to strength of illumination, and as to color.

In Figure 20 I have shown schematically such a lineated detector plate as that of Figures 8, 9 and 10, or that of Figures 6 and 7, but provided with vertical lineations, it being assumed that the scanning movements will nevertheless be horizontal. With such a vertical lineation sender it is evident that the emitted signals will be by "dots" along each scan, and that these successively scanned dot signals will come for the three colors in alternation. With such a sending scheme it is evident that the receiver should also be so arranged as to produce its replica on the viewing screen in color by means of "dot" reproduction. Such "dot" reproduction has already been described in connection with Figures 18 and 19. To receive such "dot" signals correctly in color with the arrangement of Figures 18 and 19 it would only be necessary to provide a vertically lineated screen arrangement in which there were provided the same number of lineations as the number of lineations in the sender, and with the order of color progression the same in both cases. Figure 21 shows a portion of the detector plate of Figure 20, but on enlarged scale, and also shows the order of scanning with interlaces. A vertically color lineated screen is also shown schematically in Figure 27 for the receiver, and a vertically lineated detector plate is shown in Figure 24 for the sender. These will be referred to hereinafter. In Figure 20 the proper photosensitive bands are carried to the patches 141, 142, and 143 for sending out signals to be received for the corresponding color synchronizing patches of the viewing screen. The patches 141, 142, and 143 are formed by carrying bands of the proper photosensitive materials completely across such patches, but terminating the other photosensitive bands at the edges of such patches, and leaving the areas of said patches uncoated, except at the locations of the continuations of said lineations. Thus, the area of patch 141 would be provided with lineation continuations of the particles of the $C_sO$, for red signalling, the patch 142 with lineation continuations of the particles of $C_s$ for green signalling, and the patch 143 with lineation continuations of the particles of KO for blue-violet signalling. These are stated by way of example. The portions of said patches between said lineation continuations would be uncoated with any photosensitive materials so signals would not be emitted while the beam was traversing the portions of said patches between said continuations of the lineations of the respective kinds of photosensitive materials.

When scanning is effected over a detector plate whose entire surface is of uniform signalling quality, that is, whose entire surface is provided with the minute particles of photosensitive material of the same kind, it is evident that it is not necessary to make provision for ensuring that each scanning traverse shall cover an exactly located line or band, measured from the top or the bottom edge of such detector plate. This is because all scans of such an arrangement will be produced at correct spacing, and with this scheme all signals delivered for a "field" of scan are alike, except for intensity.

On the contrary, when scanning is effected over a color lineated surface, such as that of the type shown in Figures 6 and 7, or that of Figures 8 and 9, or over any other form of detector plate wherein provision is made for color discrimination in the signals emitted by different portions of the detector plate itself, it is evident that each traversing scan must occur in exact registry with its proper lineation. Accordingly, in Figure 5 I have shown the supplemental control element 144 in connection with the iconoscope 145 in which the detector plate 133 is located to enable vertical adjustment of the zone or area over which the beam will scan. By like reasons, in case of vertical lineations, and which lineations are of different photosensitive qualities, or are responsive to different wave ranges of incident light, provision should be made for lateral adjustment of the zone of beam movement and for length of beam swing, to enable registry of the beam with predetermined color qualities at specified points in the swing of the beam.

The conventional form of Zworykin detector plate is of such construction that both the incident image forming light rays and the scanning electron beam must impinge against the same or front face of such plate. This is the plate face at which the myriad of minute photosensitive particles are located. The other face of the detector plate is provided with the conducting surface from which the signals are delivered. If a transparent color lineated screen is to be used with such a plate, such screen being located between the incident image forming light rays and the plate surface so as to discriminate or control colors admitted through such plate to various bands of the plate, for direct band color discrimination and signalling, such lineated transparent plate or screen should be located close to the surface of the detector plate to ensure good color control. Such being the case it would also be necessary for the electron beam to penetrate such transparent color lineated screen in order to be incident upon the photosensitive particles during scan. Such penetration would be necessary in order to enable such electron beam to restore electrons to the individual photosensitive particles, from which electrons had been discharged by the incidence of the image forming light rays. Such penetration of the electron beam through the color screen material would be needed in the case of such embodiments of the arrangement as shown in Figure 7. In order to avoid the need of such penetration of the color lineated screen by the scanning beam in order to act on the photosensitive particles of the detector plate I have shown an arrangement in Figures 30 to 35, both inclusive, in which the image forming light rays reach the detector plate at one face thereof, and the scanning electron beam reaches said plate at the opposite face thereof. With this arrangement the image forming light rays may be passed through a lineated color transparent screen before reaching the photosensitive particles, so that said particles will in effect constitute narrow bands or zones or lines to which will be subjected the specific color range wave lengths of incident light, to emit color controlled signals. Reference may now be made to these figures.

This form of detector plate includes a sheet of conductor, 145, generally a thin sheet of metal. This sheet is coated on each face with a sheet of insulating dielectric, being the sheets 146 and 147. This three layer combination, including the conducting sheet and the two outer layers of insulating dielectric, is then perforated with a myriad of small holes, such holes preferably being formed on alignments extending over the sheet of material in regular formation or order. For example, as shown in Figures 30 to 35, these holes may be located in rows extending both horizontally and vertically. These holes may be of the order of, say 100 per inch between their centers. Through these holes there then extended short sections of insulated wire, such as enameled wire the enameling of which is of suitable dielectric characteristic. These wires will then protrude at both faces of the sheet for short distances, but they may then be cut off substantially at the sheet surfaces, or leaving very light protuberances beyond the sheet surfaces. Thereafter the photosensitive material, such as cessated silver may be deposited over the entire area of the left-hand face of this so prepared sheet, so that such photosensitive material will electrically contact with all of the left-hand ends of the wires extending through all of the sheet holes. Thus the left-hand ends of all of the wires will now be in electrical contact with this photosensitive material, but none of the wires will be in contact with the sheet metal plate 145 between the outer sheets or layers of insulating dielectric 146 and 147. These wires are designated as 148, and the enamel insulation of them is designated as 149.

This so prepared combination is now provided with the color lineated transparent sheet 150 against its left-hand face, the lineations of the colors of this screen being aligned with the respective rows of wires extending through the body of the unit. Instead of placing a transparent lineated color screen over the left-hand face of the photosensitive material there may be provided directly on said material bands or lines of the proper colors, transparent, as by deposition or ruling suitably colored dyes in lineations which lineations will be aligned with rows of the wires across the body of the combination, or vertically thereof. Such lineations are shown in the figures.

Having prepared the combination to the above point the sheet may now be treated to separate the color lineations, and the deposit of photosensitive material, from each other by careful use of a very thin sharp cutting tool operating along through such transparent color screen and through the photosensitive deposit, but preferably not through the insulating dielectric layer 146 at the left-hand face of the metal sheet. Such cutting tool will thus separate the photosensitive deposit into a myriad of small squares, each of which is in electrical contact with one of the wires extending through the body of the detector plate to the opposite surface thereof. Also, each of these small squares or bodies of photosensitive material will be covered by a like square of transparent material of the desired color for such small body of photosensitive material. Thus light to reach such minute photosensitive body must be screened through a definitely known and definitely located color screen.

In Figure 30 the colors left on the various small photosensitive bodies are arranged in regular lineations, and with the three primary colors recurring in regular order over the face of the detector plate. Also, said bands or lineations are there shown as being horizontally located. They might equally well be vertical lineations, or otherwise located.

With such a detector plate as just described it is possible to receive the image forming light rays at one face of the plate, where it will act upon the photosensitive bodies, under exact color control or selection, whereupon each photosensitive body will release electrons according to the intensity and color of such incident light. These released electrons may flee from the photosensitive body either through the narrow slots 151 between such bodies, and between the small color transparencies, or may flow through the short wires to the other face of the detector plate and there be released out into the body of the kinescope envelope, for deposit on the inside surface of such envelope, in well understood manner. Thereafter, when the electron beam scans each one of the wire ends which are exposed at the right-hand face of the detector plate such beam will restore electrons to such wires, and through them to the small bodies of photosensitive material, according to the well understood principle.

Each small photosensitive body and its connected short wire will constitute an electrode of a small condenser, and the metal sheet 145 will constitute the other electrode for all of such small condensers. Accordingly such sheet 145 may be used for delivering the desired signals over the connection 151 for signalling purposes according to conventional or other means.

Detector plates such as that shown in Figures 30 to 35 may be used in suitable envelopes, and with suitable forms of optical systems; but it is seen that when using such a detector plate or its equivalent, there is no need for light color discrimination prior to the location at which the image forming light beam is incident upon the detector plate. Accordingly, it is possible with such a detector plate to produce the needed signals for color discrimination by use of a single iconoscope, and without need of a rotating segmental plate such as that shown at 63 in Figure 1. Furthermore, such a detector plate arrangement may be used for production of the signals with either two or three primary colors, according to the requirements of the system determined upon.

It is further possible, by use of such a detector plate arrangement, or its equivalent, to produce the signals either according to the "full line" color method in which each line is scanned under a given color, or according to the "dot" system or method in which as each line is scanned the three colors are used in regular succession and recurrently. Thus it is possible with such an arrangement to give color signals also according to the "three field" method in which all of a field of lines are first scanned for one color, then all of another field of lines are next scanned under another color, and finally all of another field of lines are scanned under still another color. Such universality of possible signals will enable use of this improved form of detector plate for various systems.

In Figure 23 I have shown schematically a set-up for use of this improved form of detector plate, including the simple optical system needed therefor in outline. In this case the incoming rays are brought to focus through the optical system shown by the lenses 152 and 153 (and possibly also the front window of the iconoscope). This optical system delivers the light beam through the flexible light-proof bellows 154 to the window 155 of the iconoscope 156. This iconoscope is provided with suitable means to produce the scanning electron beam 157 from the gun 158, and suitable horizontal and vertical beams controls are provided of well understood form and operation.

Within the iconoscope envelope and behind the window 155 there is mounted the detector plate of already described form, 159, and the transparent lineated color screen 160 is shown within the envelope and in front of the detector plate for producing the color lineations. In the form of Figures 30 to 35 inclusive, each minute photosensitive body is itself provided with its own single color screening element so that with this arrangement the additional color screen 160 may be dispensed with. It should be noted that with this arrangement, in which, as shown, the iconoscope is provided with a lens shaped window, said window will constitute a portion of the lens system.

In Figure 24 the screen 160, when used, will be provided with vertical lineations, but other forms may be used as already stated.

In Figures 25 and 26 I have shown schematically a simple form of receiving kinescope for receiving and interpreting the signals from the sending station shown in Figures 23 and 24. Figure 27 shows a vertically lineated color screen for this receiver. The front portion of the kinescope of Figures 25 and 26 is formed with curvature of generally spherical form. In Figures 28 and 29 I have shown schematically the front portion of a modified form of kinescope envelope in which the window thereof is of generally cylindrical form, that is, produced with a surface generated by movement of a line parallel to its own axis around a circular arc. With such an arrangement the needed lineations may be produced directly on the glass window by straight rulings extending parallel to the axis of cylinder generation, or other simple means.

In Figure 22 I have shown the front portion of a modified form of iconoscope envelope having a flat front window instead of the lens shaped window of Figure 23, and with the improved form of detector plate located within the envelope directly behind such flat window, and with the three color lineated screen located against the outside face of such window.

It will be seen that fundamentally my improvements include the provision of a color variegated screen in or as a portion of or in direct association with the receiving kinescope viewing screen, which color variegated screen is of a nature such that it will of itself determine the color to be viewed by the observer at each point of illumination produced by the translating or interpreting beam. Furthermore, that this screen is of such form or nature that the production of the different colors over the pattern produced on the viewing screen includes a known or predetermined pattern arrangement of such color production, and not merely an indiscriminate distribution of color areas for the different colors to be produced to the observer. It is also evident that this color production pattern on the viewing screen must be the same as that pattern used in the sending equipment, so that a known pattern of emitted signals from the sender may be received by the receiver and will be there translated, by use of a like formation of color pattern, into an exact replica of the image examined by the scanning beam of the iconoscope.

The exact form of pattern to be selected in any case will be determined by various considerations of expediency or for the production of the best results, but it has been shown that "lineated" patterns are an excellent form thereof, this term including patterns in which the several primary colors are located in true lines or bands of the primary colors recurring in regular recurrence. Also, that the arrangement may be one in which the signals are transmitted and received, either as continued color linear signals or as "dots" with the primary colors recurring regularly through the pattern. It is also pointed out, and I include within my present invention, that various other pattern arrangements are possible provided that the pattern of the receiver conforms to the pattern of the sender for the several colors used. Under this definition my invention also includes arrangements in which the distribution of the color areas of the receiver screen need not be of a regular formation, provided only that the fomation or the pattern of colors produced in the receiver screen shall be a replica of the color pattern used in the sender and by which the color signals were emitted. Thus, with a detector plate arrangement such as that of Figures 30 to 35 inclusive the various small squares of the photosensitive material at the left-hand face of the detector plate might be coated or covered with transparent dyes of the primary colors, but with the various squares rather indiscriminately located as to their color coverings, but of course with such a distribution of the variously colored squares that a good color interpretation could be had. Then the receiver would be provided with its "color lineated" screen having the primary color areas distributed over the full area of such receiver screen that a replica of the distribution of the colors at the sending end would be produced. Such an arrangement would of course present the objection of complexity and cost of production of the sending screens color arrangement, and of the receivers color screen, but such an arrangement would be within the scope of my present invention. It would, however, be possible to produce such non-uniformly spotted color replicas as needed to meet the requirements of this suggested arrangement, by photographic means, making use of a master screen having thereon the proper distribution of the variously colored areas, so that exact replicas of the distribution used in the sender could thus be produced in quantity and of uniformity of color distributions. I have already disclosed generally herein a photographic method of production of the color screens for the receivers. Such photographic method is applicable regardless of the pattern of color distribution desired, which pattern will conform to the pattern of the master pattern or template used in the photographic process.

In Figures 1, 5 and 23 I have shown a ray filter 161 interposed in the optical system at a point in advance of the detector plate; and as illustrated in said figures such ray filter is located in advance of the window of the iconoscope envelope. Such ray filter may be provided for modifying the relative color intensities of the wave lengths admitted to the iconoscope to suppress a portion of certain wave lengths if needed. Such ray filter is optional, as indicated on the drawings. It is also noted that by properly forming an element of the optical system located in the light path in advance of the detector plate it is possible to so modify the light beam that it will be delivered to the incident face of the detector plate as a series of narrow beams of the several primary colors which are to be used, such narrow beams being of a width equal to the bands which are to be scanned according to the principles hereinbefore set out. By such an arrangement it is possible to deliver to each line of scan light of that primary color to be used during such scanning traverse, to give signals of intensity based on incident light of such color. With this arrangement successive narrow bands of the detector plate will be subjected to incident light of the primary colors in regular succession, so that successive narrow bands of the detector plate will, when scanned, be scanned under the effects of such different primary colors. The signals then transmitted by the sender will be on the basis of the strengths of illumination of said bands under said respective incident light colors; and the receiver will translate the received signals with its kinescope translating beam in proper registry with lineated colors of the screen according to the principles hereinbefore disclosed.

Such light control means as that stated above may be secured by use of a series of narrow prisms extending transversely of the deflector plate, so as to split the incident light beam into the desired series of narrow bands of incident light, with such bands of the primary colors desired.

The term "television" as herein used includes the transmission to a distance of images, views, or objects by telegraphy, either with wires or without, and the features of my present invention may be used for production of the replicas in color of images examined by the sending equipment, whether the signals emitted by said sending equipment are transmitted to the receiver and translator by wire or by radio, or both, provided that the color lineated screens or equivalent elements of the present invention are included in said receiver according to the requirements of the invention hereinbefore disclosed.

A further important feature of my present invention concerns the provision of means, such as hereinbefore disclosed, for enabling the observer, looking at the viewing screen or elements suitably placed, to determine the condition of color synchronism, or lack of such color synchronism of the received replica as compared to the image being examined at the sending station, such observed means being in the form of areas or patches of color as distinguished from the replica of the image itself, together with the provision of means to enable the operator to bring about the desired color synchronism as indicated by the occurrence of the correct color areas on said patches.

I claim:

1. A screen for the production of a visible replica of an image either in monochrome, or in natural color based on a color system of translation including a plurality of primary colors, said screen including a viewing surface, parallel color lineations in close proximity to said viewing screen and including a series of groups of lineations, said groups being equal in number to the number of primary colors included in the system of translation, all of the lineations of each group delivering visible light of the same primary color, and the lineations of all of the groups being interspaced with respect to each other on said screen according to a determined order of said primary colors when traversing said screen across said lineations, said color lineations being of widths less than the center to center distances between successive lineations when traversing the screen across said lineations to thereby provide on said screen monochrome light delivering lineal spaces between successive primary color light delivering lineations, said lineations and said lineal spaces having an electron excited surface to deliver light at each point of said surface when such point is excited by impact of a scanning electron beam at such point, said primary color lineations delivering light of color corresponding to said lineations when said screen is subjected to the effect of impact of said scanning beam against the screen at the locations of said primary color lineations and to deliver light in monochrome when said screen is subjected to the effect of impact of said scanning beam against the screen at locations of said monochrome light delivering lineal spaces.

2. A screen as specified in claim 1 wherein the width of each monochrome light delivering lineal space is substantially the same as the width of a color lineation to which it is adjacent.

3. A screen as specified in claim 1 wherein the widths of all of the color lineations are substantially equal to each other.

4. A screen as specified in claim 3 wherein the widths of the monchrome light delivering lineal spaces are substantially the same as the widths of the color lineations.

5. A screen for the production of a visible replica of an image either in black and white, or in natural color based on a color system of translation including a plurality of primary colors, said screen including an electron excited surface to deliver white light at each point of said surface when such point is excited by impact of a scanning electron beam at such point, a viewing surface in front of said electron excited surface, a series of transparent color lineations between the electron excited surface and the viewing surface, said color lineations including a series of groups of lineations, said groups being equal in number to the number of primary colors included in the system of translation, all of the color lineations of each group being transparent to light wave lengths of the same primary color from said electron excited surface, and the color lineations of all the groups being interspaced with respect to each other according to a determined order of said primary colors when traversing said screen across said lineations, said color lineations being of widths less than the center to center distances between successive lineations when traversing the screen across said lineations to thereby provide on said screen white light delivering lineal spaces between successive primary color transparent lineations.

6. A screen as specified in claim 5 wherein the width of each white light delivering lineal space is substantially the same as the width of a color lineations to which it is adjacent.

7. A screen as specified in claim 5 wherein the widths of all of the color lineations are substantially equal to each other.

8. A screen as specified in claim 7 wherein the widths of the white light delivering lineal spaces are substantially the same as the widths of the color lineations.

9. A television receiver for the translation of received signals corresponding to linear scans of images, said receiver including a screen for the production of a visible replica of an image either in black and white, or in natural color based on a color system of translation including a plurality of primary colors, said screen including an electron excited surface to deliver white light at each point of said surface when such point is excited by impact of a scanning electron beam at such point, a viewing surface in front of said electron excited surface, a series of transparent color lineations between the electron excited surface and the viewing surface, said color lineations including a series of groups of lineations, said groups being equal in number to the number of primary colors included in the system of translation, all of the color lineations of each group being transparent to light waves of the same primary color from said electron excited surface, and the color lineations of all the groups being interspaced with respect to each other according to a determined order of said primary colors when traversing said screen across said lineations, said color lineations being of widths less than the center to center distances between successive lineations when traversing the screen across said lineations to thereby provide on said screen white light delivering lineal spaces between the successive primary color transparent lineations, means to generate said electron beam and to modulate the strength of said beam according to the strengths of the received signals, means to cause said beam to execute linear scans synchronously with the scans of the images, means to regularly shift the line of scan of said beam synchronously with shifts of the scans of the images to thereby cause said beam to execute regularly spaced scans of the point of impact of the beam against the electron excited surface in synchronism with successive scans of the images, said spacing of the scans of the point of impact of the beam with said surface being equal to a multiple of the center to center distance between the screen lineations, together with means to shift the beam in a direction normal to the direction of the beam scans to thereby cause the point of impact of the beam to travel on a color lineation during each scan of the beam or on a white light delivering space during each scan of the beam as selected.

10. A television receiver for the translation of received signals corresponding to linear scans of images, said receiver including a screen for the production of a visible replica of an image either in black and white, or in natural colors based on a color system of translation including a plurality of primary colors, said screen including a viewing surface, parallel color lineations in close proximity to said viewing screen and including a series of groups of lineations, said groups being equal in number to the number of primary colors included in the system of translation, all of the lineations of each group delivering visible light of the same primary color, and the lineations of all of the groups being interspaced with respect to each other on said screen according to a determined order of said primary colors when traversing said screen across said lineations, said color lineations being of widths less than the center to center distances between successive lineations when traversing the screen across said lineations to thereby provide on said screen monochrome light delivering lineal spaces between successive primary color light delivering lineations, said lineations and said lineal spaces having an electron excited surface to deliver light at each point of said surface when such point is excited by impact of a scanning electron beam at such point, said primary color lineations delivering light of color corresponding to said lineations when said screen is subjected to the effect of impact of said scanning beam against the screen at the locations of said primary color lineations and to deliver light in monochrome when said screen is subjected to the effect of impact of said scanning beam against the screen at locations of said monochrome light delivering lineal spaces, means to generate said electron beam and to modulate the strength of said beam according to the strengths of the received signals, means to cause said beam to execute linear scans synchronously with the scans of the images, means to regularly shift the line of scan of said beam synchronously with shifts of the scans of the images to thereby cause said beam to execute regularly spaced scans of the point of impact of the beam against the electron excited surface in synchronism with successive scans of the images, said spacing of the scans of the point of impact of the beam with said surface being equal to a multiple of the center to center distance between the screen lineations, together with means to shift the beam in a direction normal to the direction of the beam scans to thereby cause the point of impact of the beam to travel on a color lineation during each scan of the beam or on a monochrome light delivering space during each scan of the beam as selected.

11. A kinescope for television reception and the like, including a viewing screen window, a series of parallel transparent color lineations on the surface of said window, each lineation being of uniform color throughout its length, and the lineations comprising a series of groups, all the lineations of each group being of the same primary color, said groups being equal in number to the number of primary colors included in a color system of television, and the lineations of all of the groups being interspaced with respect to each other on said window surface according to a determined order of said primary colors when crossing said lineations in a continuous direction, all of said lineations comprising photographic color settings of a photographic coating on said window surface, a film of transparent protective material on the surface of said photographic settings, and a coating of electron excitable phosphor on said film of transparent material, said phosphor producing white light when electronically excited.

12. A method of producing a color lineated transparent screen on the surface of the window of a kinescope, comprising the deposit of a coating of polychromatic responsive photographic emulsion on the surface of said window, exposure of said photographic emulsion to the effect of a series of narrow light lineations to effect changes in said emulsion at the locations of said light lineations, each light lineation being of uniform color throughout its length, and the light lineations comprising a series of groups, and the light lineations of each group being of the same color, said groups being equal in number to the number of primary colors included in a color system of television, and the light lineations of all the groups being interspaced with respect to each other according to a determined order of said primary colors when crossing said light lineations in a continuous direction, and the treatment of the exposed emulsion to bring out and set said emulsion to produce a series of transparent lineations of the said primary colors and of said determined order of said primary colors, and deposit of a coating of phosphor on the area embraced by said lineations, said phosphor coating being electronically excitable to produce white light.

13. A method according to claim 12, together with the deposit of a film of transparent protective material on the treated and set photographic emulsion prior to the deposit of said coating of phosphor as aforesaid.

14. A method as specified in claim 12 wherein the surface of the kinescope window is planar.

15. A method as specified in claim 12 wherein the surface of the kinescope window is curved.

16. A method as specified in claim 13 wherein the surface of the kinescope window is planar.

17. A method as specified in claim 13 wherein the surface of the kinescope window is curved.

18. A kinescope for television reception in natural color, comprising a viewing screen and window section, a series of transparent parallel color lineations on the inside surface of said window, each lineation being of uniform color throughout its length, and the lineations comprising a series of groups, the lineations of each group being of the same color, said groups being equal in number to the number of primary colors included in a system of color television, and the lineations of all the groups being interspaced with respect to each other according to a determined order of said primary colors when crossing said lineations in a continuous direction, a body envelope for said kinescope, and a gas tight sealed connection between the marginal portion of the window section and the proximate portion of the body envelope.

19. A kinescope as specified in claim 18 wherein said color lineations comprise treated and set photographic emulsion, and wherein the gas tight sealed connection between the marginal portion of the window section and the proximate portion of the body envelope comprises a fused connection.

20. A method of producing a kinescope having a viewing screen provided with a series of transparent color lineations on the inside surface of said viewing screen, which method includes the formation of said color lineations on the inside surface area of said viewing screen, treating the exposed surface area of said color lineations to a transparent protecting coating, sealing the marginal portion of said viewing screen element to the marginal portion of an envelope element by application of heat treatment to said marginal portion with simultaneous removal of convected heat from the viewing screen over the area of said color lineations, and deposit of suitable phosphor on the protecting coating aforesaid, and exhaustion of the kinescope to a suitable vacuum.

21. The method as specified in claim 20 wherein said viewing screen is planar.

22. The method as specified in claim 20 wherein said viewing screen is curved.

23. An iconoscope detector plate for controlling the strengths of scanning signals in a system of television in natural color, which system includes a series comprising a plurality of primary colors and includes the transmission of signals for each primary color of said series in a controlled pattern of progress from color to color through the series according to a predetermined cycle of said colors, said detector plate including a sheet of dielectric, a conducting layer on one surface of said dielectric sheet, and areas of photosensitive material on the opposite scanning face of the detector plate, said areas comprising individual bodies of photosensitive material, the material comprising the body of each area being more photosensitive to wave lengths of one primary color of said series than to wave lengths of the other primary colors of said series, there being groups of said areas corresponding to each primary color of said series, the material comprising the bodies of all of the areas of each group being most photosensitive to wave lengths of the primary color of said group, and the areas of the groups being interspaced with respect to each other over the surface of the detector plate according to the pattern of scanning said areas to produce said pattern of progress from color to color.

24. A detector plate as specified in claim 23 wherein the areas of photosensitive material comprise lineations, and wherein the bodies of photosensitive material in each lineation are most photosensitive to wave lengths of the same primary color of the series of primary colors, and wherein said lineations are interspaced with respect to each other over the area of the detector plate according to the pattern of scanning.

25. An iconoscope detector plate for controlling the strengths of scanning signals in a system of television in natural color, which system includes a series comprising a plurality of primary colors and includes the transmission of signals for each primary color of said series in a controlled pattern of progress from color to color through the series according to a predetermined cycle of said colors, said detector plate including a sheet of dielectric, a conducting layer on one surface of said dielectric sheet, and individual bodies of photosensitive material over the opposite scanning face of the detector plate, the material composing the bodies being coextensive with the area to be scanned, and a series of transparent lineations in close association with said photosensitive body area, the lineations comprising a series of groups, all of the lineations of each group being transparent to wave lengths of a primary color individual to such group and substantially opaque to wave lengths of the other primary colors of the series of primary colors, each transparent lineation delivering wave lengths of the primary color to which such lineation is transparent, to the bodies of photosensitive material which are in the paths of the wave lengths so delivered, and the bodies of photosensitive material being photosensitive to the wave lengths so delivered to them, together with means to scan each lineation, said scanning means including an electronic beam, and means to cause said beam to scan each lineation.

26. A detector plate as specified in claim 25 wherein the successive transparent lineations are separated from each other to provide spaces for flight of electrons released from the bodies of photosensitive material.

27. An iconoscope detector plate for controlling the strengths of scanning signals in a system of television in natural color which system includes a series comprising a plurality of primary colors and includes the transmission of signals for each primary color in said series according to a controlled scanning pattern of progress from color to color through a series according to a predetermined cycle of said colors, said detector plate including a sheet of conducting material having an image face at one side and having a scanning face at the other side, a multiplicity of separate conductors extending through said sheet of conducting material from the image face to the scanning face of said plate and insulated from said sheet, said conductors being located at spacings from each other according to a regular pattern, photosensitive material on each conductor at the image face thereof, and a transparent color screen in close proximity to the photosensitive material on each conductor at the wave incident surface of said material, together with an electron beam at the scanning face thereof and means to cause said beam to scan the conductors at the scanning face of the detector plate according to the scanning pattern, the transparent screen which is in close proximity to the photosensitive material on each conductor being transparent to wave lengths of the primary color corresponding to the location of such conductor in the scanning pattern.

28. A detector plate as specified in claim 27 wherein the scanning pattern includes successive linear scans of the scanning beam, and wherein the transparent screens of all of the conductors scanned at each scan are transparent to wave lengths of the same primary color of said series.

29. A detector plate as specified in claim 27 wherein there are narrow spaces between the successive bodies of photosensitive material on the conductors at the image face of the detector plate permitting flight of released electrons through said narrow spaces.

30. In a system of color television based on a plurality of primary colors which system includes a sender including a sending plate on which an image to be televised is projected and means to scan discreet areas of said image, including means to scan different areas to produce signals of strengths proportionate to the intensities of the wave lengths of light of the said primary colors arriving at said areas, said signals comprising a series of groups, there being one group of said signals corresponding to each of said primary colors, and the areas scanned for the signals of all of said groups being interspaced with respect to each other over the scanned area of the said plate according to a predetermined and repetitious pattern of the primary colors to which said signals correspond, a receiver including viewing screen means and means to produce on the viewing screen of said viewing screen means, discreet areas of illumination corresponding in timing, in space relationship, and in intensity of illumination of said viewing screen areas, to the like qualities of the scanning signals produced by the sender, said viewing screen means including means to produce on each of said discreet areas of the viewing screen illumination of one of the primary colors of said system when such discreet area is so illuminated, said primary color producing means for the discreet areas of the viewing screen including means to produce on said discreet areas of the viewing screen the primary colors in interspaced relationship with respect to each other and according to the same predetermined and repetitious pattern of the primary colors to which the signals from the sender correspond, there being in said signal sending means a patch of the signal sending plate including only signal sending areas for signals of scan of one of the groups of primary color which areas are located in positions of said patch corresponding to said predetermined and repetitious pattern for areas of the group which includes said patch areas, and there being in the viewing screen illumination producing means, means to produce a patch corresponding in spatial position on said viewing screen to the spatial position of the sending plate patch, and to produce in said viewing screen patch areas of illumination of the same color as as the primary color for the signals of the areas included in the sending means plate patch, said patch areas of the viewing screen patch being located spatially according to said predetermined pattern.

31. Means as specified in claim 30 in which the means to produce said discreet areas of illumination on the viewing screen includes a scanning beam and means to cause the intensity of said scanning beam to vary proportionately to the strengths of the signals received from the sender, and means to cause said scanning beam to repetitiously move through successive cycles of movement according to said predetermined pattern through successive frames of such cyclic movements, together with means to vary the movements of said scanning beam of the receiver to shift said frames of cyclic movements of said beam with respect to the viewing screen to thereby shift the location at which each discreet area of illumination of each frame of cyclic movements is produced on the viewing screen, each cycle of movement of the scanning beam of the receiver including numerous scanning elements of such cycle, whereby shift of the movements of the scanning beam and shift of the frames of such movements changes the discreet areas of the viewing screen means which are illuminated by said beam at specified stages of the cycles of beam movements as compared to the locations of the areas of the viewing screen illuminated by said beam at such specified stages of the cycles prior to such shift of the frames of beam movements.

32. A system as specified in claim 30 in which the scanned areas are located in lineations and in which the means to scan the areas of the sending plate produces linear scanning of said areas, and in which system the discreet areas of illumination are produced on the viewing screen in linear fashion, and in which system the signal sending areas in the patch of the signal sending plate comprise a lineal extension of at least one lineation of scanned areas of the sending plate, and in which system the viewing screen patch areas of illumination are produced in linear fashion corresponding to the lineal extension of a lineation of scanned areas of the sending plate.

33. A system as specified in claim 32 in which the means to produce said discreet areas of illumination on the viewing screen includes a scanning beam and means to cause the intensity of said scanning beam to vary proportionately to the strengths of the signals received from the sender, and means to cause said scanning beam to repetitiously move through successive cycles of movement according to said predetermined pattern through successive frames of such cyclic movements, each such frame including numerous lineations of the areas of illumination, together with means to vary the movements of the scanning beam of the receiver to shift said frames of cyclic movements of said beam with respect to the viewing screen to thereby shift the location at which each discreet area of illumination of each frame of cyclic movements is produced on the viewing screen, each cycle of movement of the scanning beam of the receiver including numerous scanning elements of such cycle, whereby a lineation of movement of the scanning beam of the receiver which lineation includes signals for scan of the signal areas contained in the patch of the signal sending plate may be registered with a selected lineal extension of areas contained in the patch of the viewing screen.

34. In a system of color television based on a plurality of primary colors which system includes a sender including a sending plate on which an image to be televised is projected, and means to scan said image by successive parallel linear scans of a scanning beam along said linear scans, and also includes means to cause successive linear scans to be displaced from each other by predetermined amounts and through a predetermined pattern over the area of the image, and including means to produce signals of strengths instantaneously proportional to the intensities of the wave lengths of the light arriving at the sending plate at the instantaneous points of scan along said lines when said wave lengths are for the same primary color during the entire scan of each line for production of signals, the scans comprising a series of groups, there being one group of scans corresponding to each of said primary colors, and the scans of the different groups of the series being interspaced with respect to each other over the surface of the sending plate according to a regular series of the colors, the timing succession of the scans of the different colors being according to a predetermined cycle of said colors, a receiver including viewing screen means and means to produce on the viewing screen of said viewing screen means visible lineations of illumination, said illumination producing means including a scanning beam, means to cause the intensity of said scanning beam to vary proportionately to the strengths of the signals received from the sender, and means to cause said beam to execute linear scans for said lineations of illumination of the viewing screen, said viewing screen means including lineations of a nature to produce visible light at the area of incidence of the scanning beam with any one of said lineations and of intensity proportionate to the strength of the scanning beam at such area of incidence, the lineations comprising a series of groups corresponding to the groups of scans of the sender, each of the lineations of each group of the viewing screen means producing light visible to the observer and of the same primary color when such lineation is scanned by the scanning beam of the receiver, the lineations of said groups being interspaced with respect to each other over the area of the viewing screen according to the same regular series of the colors as the color series of the scans of the sender, and means to cause the linear scans of the scanning beam of the receiver to occur in synchronism with the linear scans of the scanning beam of the sender, the spatial and color sequence of the scans of the receiver scanning beam corresponding to the spatial and color sequence of the scans of the sender, all of the lineal scans of the receiver scanning beam for the series of groups comprising a frame of scans, there being a patch of the sending plate of size to embrace a plurality of the scans of the scanning beam and of size to include projected portions of lineations for all of the primary colors, and the lineations of only a selected one of the primary colors extending into said patch, and there being a patch of the viewing screen means of the receiver located spatially on said viewing screen means at position corresponding to the position of the patch of the sending plate and of size to include projected portions of lineations for all of the primary colors in said patch, and the lineations of at least one of the primary colors extending into said patch, being the same primary color as that for which lineations of the sending plate extend into the patch of that plate.

35. A system as specified in claim 34, together with means to cause the scanning beam of the receiver to execute each of its scans at a predetermined spatial location within the frame of scans, and means to shift the spatial location of said frame of scans with respect to the viewing screen means of the receiver to thereby change the spatial location of each scan of the receiver scanning beam with respect to any selected point of the area of the viewing screen.

36. A system as specified in claim 34 wherein lineations of a plurality of the primary colors extend into the patch of the viewing screen means.

37. A system as specified in claim 35 wherein lineations of a plurality of the primary colors extend into the patch of the viewing screen means.

38. A system as specified in claim 34 wherein there are a plurality of patches of the sending plate located at different locations on said plate, and wherein the lineations of only a selected one of the primary colors extend into each of said patches, the primary colors of the lineations which extend into each patch being different from the primary colors of the lineations extending into the other patches, and wherein there are a plurality of patches of the viewing screen means located spatially on said viewing screen means at positions corresponding to the positions of the patches of the sending plate, and of size to include projected portions of lineations for all of the primary colors in such patch, and the lineations of at least one of the primary colors extending into each of the patches of the viewing screen means, the lineations which extend into each of the patches of the viewing screen means being for color the same as the color of the lineations which extend into the correspondingly spatially located patch of the sending plate.

39. A system as specified in claim 35 wherein there are a plurality of patches of the sending plate located at different locations on said plate, and wherein the lineations of only a selected one of the primary colors extend into each of said patches, the primary colors of the lineations which extend into each patch being different from the primary colors of the lineations extending into the other patches, and wherein there are a plurality of patches of the viewing screen means located spatially on said viewing screen means at positions corresponding to the positions of the patches of the sending plate, and of size to include projected portions of lineations for all of the primary colors in such patch, and the lineations of at least one of the primary colors extending into each of the patches of the viewing screen means, the lineations which extend into each of the patches of the viewing screen means being for color the same as the color of the lineations which extend into the corresponding spatially located patch of the sending plate.

40. Means as specified in claim 39 wherein lineations of a plurality of primary colors extend into each of the patches of the viewing screen means.

References Cited in the file of this patent

UNITED STATES PATENTS

| Number | Name | Date |
|---|---|---|
| 2,296,908 | Crosby | Sept. 29, 1942 |
| 2,309,506 | Herbst | Jan. 26, 1943 |
| 2,310,863 | Leverenz | Feb. 9, 1943 |
| 2,415,059 | Zworykin | Jan. 28, 1947 |
| 2,416,056 | Kallmann | Feb. 18, 1947 |
| 2,431,115 | Goldsmith | Nov. 18, 1947 |
| 2,480,848 | Geer | Sept. 6, 1949 |
| 2,530,431 | Huffman | Nov. 21, 1950 |